(12) United States Patent
Kato

(10) Patent No.: US 6,415,055 B1
(45) Date of Patent: Jul. 2, 2002

(54) MOVING IMAGE ENCODING METHOD AND APPARATUS, AND MOVING IMAGE DECODING METHOD AND APPARATUS

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/571,204

(22) Filed: Dec. 12, 1995

(30) Foreign Application Priority Data

Dec. 12, 1994 (JP) .............................................. 6-332673
Aug. 18, 1995 (JP) .............................................. 7-210665

(51) Int. Cl.$^7$ .............................. G06K 9/36; H04N 7/12
(52) U.S. Cl. ................... 382/236; 382/238; 375/240.14
(58) Field of Search ................................. 348/411, 412, 348/413, 415, 416, 430, 699, 700, 409, 394, 420; 382/236, 238; 386/111; 375/240.14, 240.12, 240.13, 240.16, 240.18

(56) References Cited

U.S. PATENT DOCUMENTS 4,982,285 A * 1/1991 Sugiyama ..................... 348/415
5,347,308 A * 9/1994 Wai .............................. 348/420

* cited by examiner

Primary Examiner—Wenpeng Chen
(74) Attorney, Agent, or Firm—Frommer Lawrence & Haug LLP; William S. Frommer; Bruno Polito

(57) ABSTRACT

A moving image signal encoding and decoding method to enhance coding efficiency. In motion compensation predictive coding a moving image signal, in an inter picture distance calculation circuit 10, a distance for a time preceding past reference picture and a distance for a time following future reference picture are calculated by the video signal of a predetermined picture unit, and in a predictive mode determination circuit 8, motion compensation predictive coding, which is applied to the video signal of a predetermined picture unit, is selected in accordance with the calculated distances.

7 Claims, 15 Drawing Sheets

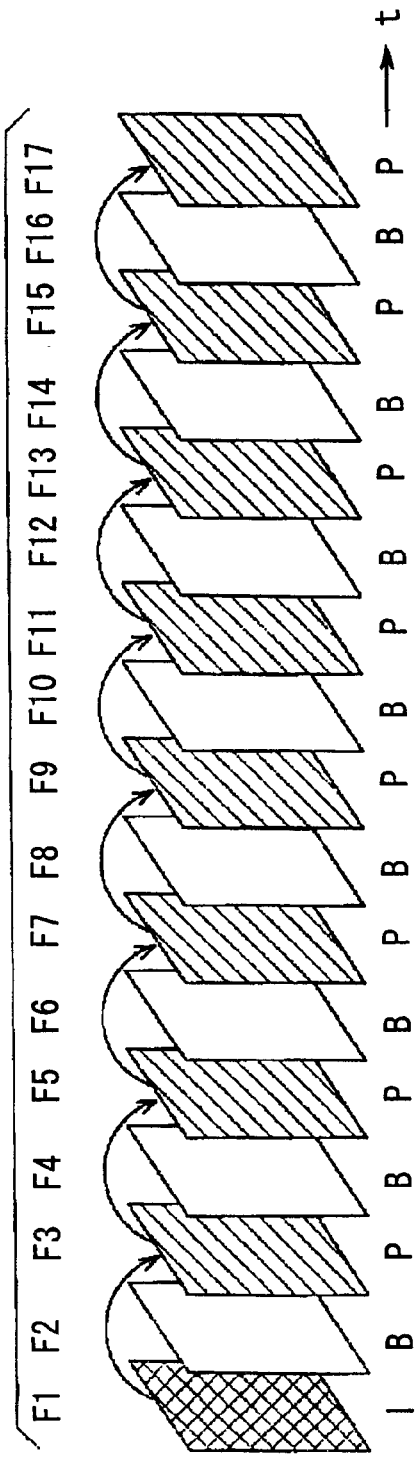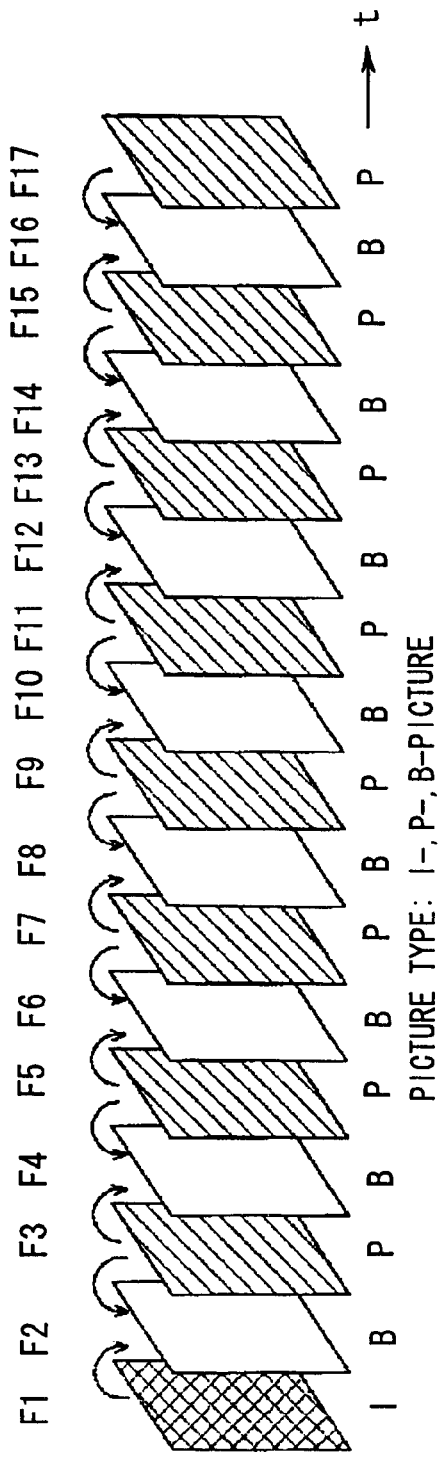
FIG. 2A (RELATED ART)
FIG. 2B (RELATED ART)

NORMAL DECODING

ERROR CORRECTION OF "B$_2$" (HATCHED PORTION) BY "P$_1$"

ERROR CORRECTION OF "B$_3$" (HATCHED PORTION) BY "P$_1$"

| | F1 | F2 | F3 | F4 | F5 | F6 | F7 | F8 | F9 | F10 | F11 | F12 | F13 | F14 | F15 | F16 |
|---|---|---|---|---|---|---|---|---|---|---|---|---|---|---|---|---|
| FIG. 9A INPUT PICTURE | I₁ | B₂ | B₃ | P₄ | B₅ | B₆ | P₇ | B₈ | B₉ | P₁₀ | B₁₁ | B₁₂ | P₁₃ | B₁₄ | B₁₅ | P₁₆ |
| FIG. 9B PICTURE CODING TYPE | I₁ | | B₃ | P₄ | B₅ | B₆ | P₇ | B₈ | B₉ | P₁₀ | B₁₁ | B₁₂ | P₁₃ | B₁₄ | B₁₅ | P₁₆ |
| FIG. 9C PICTURE CODING ORDER REARRANGEMENT | | | I₁ | P₄ | B₂ | B₃ | P₇ | B₅ | B₆ | P₁₀ | B₈ | B₉ | P₁₃ | B₁₁ | B₁₂ | P₁₆ |
| FIG. 9D COUNTER OUTPUT: CNT | | | 0 | 0 | 1 | 2 | 0 | 1 | 2 | 0 | 1 | 2 | 0 | 1 | 2 | 0 |
| FIG. 9E DISTANCE TO PAST REFERENCE PICTURE: Df | | | | | 1 | 2 | | 1 | 2 | | 1 | 2 | | 1 | 2 | |
| FIG. 9F DISTANCE TO FUTURE REFERENCE PICTURE: Db | | | | | 2 | 1 | | 2 | 1 | | 2 | 1 | | 2 | 1 | |

CASE OF Df=1 AND Db=2

CASE OF Df=2 AND Db=1

NORMAL DECODING

ERROR CORRECTION OF "B$_2$" (HATCHED PORTION) BY "P$_1$"

ERROR CORRECTION OF "B$_3$" (HATCHED PORTION) BY "P$_4$"

| PICTURE CODING TYPE | I₁ | P₄ | B₂ | B₃ | P₇ | B₅ | B₆ | P₁₀ | B₈ | B₉ | P₁₃ | B₁₁ | B₁₂ | P₁₆ |
|---|---|---|---|---|---|---|---|---|---|---|---|---|---|---|
| S10 | 1 | 4 | 4 | 4 | 7 | 7 | 7 | 10 | 10 | 10 | 13 | 13 | 13 | 16 |
| S11 | 1 | 4 | 2 | 3 | 7 | 5 | 6 | 10 | 8 | 9 | 13 | 11 | 12 | 16 |
| S12 |   |   |   |   |   |   |   |   |   |   |   |   |   |   |
| S13 | – | 1 | 1 | 1 | 4 | 4 | 4 | 7 | 7 | 7 | 10 | 10 | 10 | 13 |
| S14 |   |   |   |   |   |   |   |   |   |   |   |   |   |   |
| S15 | 0 | 0 | 2 | 1 | 0 | 2 | 1 | 0 | 2 | 1 | 0 | 2 | 1 | 0 |
| S16 | – | 3 | 1 | 2 | 3 | 1 | 2 | 3 | 1 | 2 | 3 | 1 | 2 | 3 |

DISPLAY ORDER

FIG. 15

MOVING IMAGE ENCODING METHOD AND APPARATUS, AND MOVING IMAGE DECODING METHOD AND APPARATUS

BACKGROUND OF THE INVENTION

1. Field of the Invention

This invention relates to a moving image encoding method and apparatus which is suitable in recording or reproducing a moving image signal to or from a recording medium such as a magneto-optical disc or magnetic tape to display it on a display, or in transmitting a moving image signal from a transmitting side to a receiving side by way of a transmission line such as video conference systems, video telephone systems, or equipments for broadcasting. The invention also relates to a moving image decoding method and apparatus for reproducing a moving image signal, from a signal obtained by motion compensation predictive coding.

2. Description of the Related Art

Heretofore, in a case where a moving image is digitalized, recorded or transmitted, coding (compressing) of data has been performed because data size becomes massive. As a representative coding method, there is motion compensation predictive coding.

FIG. 1 shows the principles of the motion compensation predictive coding. The motion compensation predictive coding is a method which makes use of a correlation of the time axis direction of video signals. That is, the motion compensation is a method where the present motion vector of an object to be coded is estimated from a video signal which has already been decoded and reproduced, the decoded and reproduced video signal is moved in accordance with the motion of a signal, and the movement data (motion vector) and a prediction error obtained at that time are transmitted, so as to compress data size necessary for coding. is compressed by transmitting data of this movement (motion vector) and a prediction error obtained at that time.

Moving Picture Expert Group (MPEG) is known as a representative of this motion compensation predictive coding. The MPEG is a popular name of the moving image encoding collected together in the Working Group (WG) 11 of Sub Committee (SC) 29 of Joint Technical Committee (JTC) 1 of ISO and IEC.

In the MPEG, one picture (frame or field) is divided into small units called a macroblock which is constituted by 16 lines ×16 pixels, and motion compensation predictive coding is performed at units of this macroblock. The motion compensation predictive coding is roughly grouped into two methods: intra coding and non-intra coding. The intra coding is a coding method which uses only information of a self-macroblock, and the non-intra coding is a coding method which uses both the information of a self-macroblock and information obtained from a picture which appears at another time.

In the MPEG, each frame picture is coded as any of three kinds of pictures: an intra coded picture (I-picture), a predictive coded picture (P-picture), and a bidirectionally predictive coded picture (B-picture). That is, as shown in FIGS. 2A and 2B for example, video signal of 17 frames of frames F1 to F17 is considered as a group of pictures (GOP) which is one unit of processing.

As shown in FIGS. 2A and 2B, the video signal of first frame F1 of the GOP is coded as an I-picture, that of second frame F2 is coded as a B-picture, and that of third frame F3 is coded as a P-picture, for example. The frames F4 to F17 are alternately processed as a B-picture or a P-picture. In FIGS. 2A and 2B, an arrow from one picture to another represents a direction of prediction (the same shall apply hereinafter).

For the video signal of the I-picture, the video signal of one frame, as it is, is coded and transmitted. For the video signal of the P-picture, as shown in FIG. 2A, basically there is coded and transmitted a difference between the video signal of the P-picture and either of the video signal of the I-picture or the past P-picture being in the past point of time. Also, for the video signal of the B-picture, as shown in FIG. 2B, basically there is coded and transmitted a difference between the video signal of the B-picture and either of a frame being in the past point of time and a frame being in the future point of time, or there is coded and transmitted a difference between the video signal of the B-picture and both of a frame being in the past point of time and a frame being in the future point of time.

The principles of a method of coding a moving image signal are shown in FIGS. 3A and 3B. As shown in FIGS. 3A and 3B, since the first frame F1 is processed as an I-picture, all of the macroblocks are intra-coded and transmitted as transmission data F1X to a transmission line. For the frame F3 of the P-picture, with the past frame F1 being in the past point of time as a reference picture, a prediction error (SP3) from the frame F1 is calculated, and transmitted as transmission data F3X, together with a motion vector x3 (forward predictive coding). In this case, the original data of the frame F3, as it is, is transmitted as transmission data F3X (SP1) (intra coding). These methods can be switched at units of a macroblock.

For the frame F2 of the B-picture, there is calculated a prediction error between the frame F2 and either or both of the frame Fl being in the past point of time and the frame F3 being in the future point of time, and this is transmitted as transmission data F2X. For the process of this B-picture, there are four kinds of processes at a macroblock unit: (1) intra mode (intra coding), (2) forward predictive mode (forward predictive coding), (3) backward predictive mode (backward predictive coding), and (4) bidirectionally predictive mode (bidirectionally predictive coding).

The process in the intra mode is the process (SP1) of transmitting the data of the original frame F2, as it is, as transmission data F2X, and is the same process as the case of the I-picture. The process in the forward predictive mode is the process of transmitting a prediction error SP3 obtained from the reference frame F1 being in the past point of time and also transmitting the motion vector x1 (motion vector between the frames F1 and F2). The process of the backward predictive mode is the process of calculating a prediction error (SP2) with the reference frame F3 being in the future point of time and transmitting the error (SP2) and the motion vector x2 (motion vector between the frames F3 and F2).

The process in the bidirectionally predictive mode is the process of obtaining a prediction error SP4 from an average value of two prediction pictures obtained from both of the past reference frame F1 and the future reference frame F3 and also transmitting this error as transmission data F2X, together with the motion vectors x1 and x2. For the B-picture, the aforementioned four kinds of methods can be switched at units of a macroblock. Among these methods, the processes of the forward predictive mode, the backward predictive mode, and the bidirectionally predictive coding are a non-intra coding method.

The moving image encoding apparatus should select a method whose coding efficiency is best among the aforementioned four modes, in coding the macroblock of the B-picture. Ideally, it is desirable that the macroblock be coded with four kinds of methods and then a method where the size of transmission data is least be selected. However, this method has the problem that the scale of the hardware becomes large.

As a method for solving this problem, there has been proposed a method in U.S. patent Ser. No. 08/123560, filed on Sep. 17, 1993, now (U.S. Pat. No. 5,461,420, issued on Dec. 24, 1995) in the process (motion estimation: ME) of estimating forward and backward motion vectors of a macroblock, forward and backward motion vector estimation errors (ME errors) are obtained and, based on these values, the non-intra predictive coding of the macroblock is selected.

The motion vector estimation error is obtained by, for example, calculating the sum of absolute value of a difference in each pixel between a prediction macroblock obtained from the motion vector and a macroblock of an object to be coded. This motion vector estimation error is obtained for both the forward vector and the backward vector. The selection method of the non-intra coding at this time will be explained based on FIG. 4.

In FIG. 4, if the estimation error of the forward motion vector and the estimation error of the backward motion vector are expressed by Ef and Eb, respectively, then non-intra coding will be selected as follows. That is, (1) in the case of Eb>j×Ef, the forward predictive mode is selected. (2) In the case of Eb<k×Ef, the backward predictive mode is selected. (3) In the case of k×Ef≦Eb≦j×Ef, the bidirectionally predictive mode is selected. In these equations, "j" and "k" are, for example, j=2 and k=½.

In this selection method, when the estimation error Ef of the forward motion vector is relatively small (e.g., half) as compared with the estimation error Eb of the backward motion vector, the forward predictive mode is selected, and when the estimation error Eb of the backward motion vector is relatively small (e.g., half) as compared with the estimation error Ef of the forward motion vector, the backward predictive mode is selected. In the case other than these cases, the bidirectionally predictive mode is selected.

Incidentally, in the case of a prediction structure where a single B-picture exists between I- and P-pictures or between P-pictures, such as that shown in FIGS. 2A and 2B, the aforementioned selection method of the non-intra coding can obtain a satisfactory result. However, for example, as shown in FIGS. 5A and 5B, in the case of a prediction structure where two or more B-pictures exist between I- and P-pictures or between Ppictures, if the selection method of the non-intra coding is applied, there will be the problem that coding efficiency is not good.

That is, as compared with the method where all kinds of non-intra coding are tried and then non-intra coding where data size becomes most minimum is selected, in the aforementioned selection method of the non-intra coding there are many cases where the bidirectionally predictive mode is selected by mistake. In other words, there was the problem that, even in a case coding efficiency is bad, the bidirectionally predictive coding mode is selected.

On the other hand, in a case where the coded data obtained by coding a moving image signal by motion compensation predictive coding is decoded, the information for motion compensation and the prediction error is decoded from the transmitted coded data, the reference picture indicated by the motion compensation information is moved based on the motion vector, and the prediction error is added to the moved reference picture, thereby reproducing the moving image.

More specifically, a method of decoding motion compensation coded data is described with FIGS. 5A and 5B of a prediction structure where two or more B-pictures exist between I- and P-pictures or between P-pictures. Initially, the coded data of the I-picture shown at the frame F1 is received. The I-picture is coded without referring to other pictures, because, as described above, all macroblocks have been coded by intra coding, i.e., they have been coded only by the self-video signal.

Next, the coded data of the P-picture shown at the frame F4 is received. Since basically the P-picture has been coded with the motion compensation prediction from the I- or P-picture being in the past, as shown in FIG. 2A, the P-picture is motion-compensated and decoded by using as a reference picture the decoded picture obtained by decoding the coded data of the past I- or P-picture. In the case of this frame F4, the P-picture is motion-compensated and decoded with the decoded picture of the frame F1 as a reference picture.

Next, the coded data of the B-pictures are received in order of frame F2 and frame F3. Since the B-pictures have been coded by the motion compensation prediction where pictures being in the past and future points of time are used as a reference picture, as shown in FIG. 2B, the B- pictures are motion-compensated and decoded by using as a reference picture the decoded pictures obtained by decoding the coded data of the past and future frames. In this case, the B-pictures are motion-compensated and decoded with both of the frames F1 and F4 as a reference picture. Note that these B-pictures are by no means used as a reference picture for motion compensation.

Subsequently, frames F5 to F16 are decoded according to the type of the picture in the aforementioned same way.

Incidentally, if there occurs a case such as some of the motion compensation coded data are being dropped and, for example, it becomes impossible to decode the motion compensation information and the prediction error of the macroblock, then a picture of that portion will be dropped and picture quality will be considerably deteriorated from the point of visual sensation. To make such deterioration in picture quality inconspicuous, normally an error correction is made in decoding.

As a conventional method for this error correction, there is a method where, for example, when a macroblock of an arbitrary picture is dropped, the dropped macroblock is replaced with a macroblock being in the same position in a past reference picture of motion compensation, as shown in FIGS. 6A to 6C. That is, in FIGS. 6A to 6C, B-pictures $B_2$ and $B_3$ are between P-pictures $P_1$ and $P_4$, and it is assumed that, when pictures are normally decoded, pictures such as those shown in FIG. 6A are obtained. In this case, when an error occurs in the hatched portion of the B-picture $B_2$, as shown, for example, in FIG. 6B, the macroblocks of the hatched portion of the B-picture $B_2$ are replaced with the macroblocks of the hatched portion of the P-picture $P_1$ corresponding to the hatched portion of the B-picture $B_2$. More specifically, for macroblocks where an error is corrected (i.e., hatched portion of the B-picture $B_2$), the motion vector is reset to "0", the prediction error is set to "0", and a motion compensation is made with the past reference picture (i.e., hatched portion of the P-picture $P_1$). In this way, deterioration in picture quality was made inconspicuous.

However, in a case where the error correction of the B-picture was performed by the conventional error correction technique, there were some cases where the motion of the moving image became unnatural. For example, when the pictures $P_1$ and $P_4$ are correctly decoded and then the decoding of the macroblocks of the hatched portion of the B-picture $B_3$ becomes impossible, as shown in FIG. 6C, the error correction of the lost macroblocks of the hatched portion of the aforementioned B-picture $B_3$ is to be performed with the macroblocks of the hatched portion of the P-picture $P_1$ which is the past reference picture, as described above. However, in this case, although the moving images are moving in order of P-picture $P_1$, B-picture $B_2$, B-picture $B_3$, and P-picture $P_4$, the hatched portion of the B-picture $B_3$ is to be replaced with the picture of the hatched portion of the P-picture $P_1$. That is, in the case of FIG. 6C, if the aforementioned replacement of the pictures is performed, then the picture will go backward. Particularly, when the motion of the moving image is a horizontal motion such as a pan operation in the operation of a camera, the aforementioned backward motion becomes very conspicuous.

SUMMARY OF THE INVENTION

In view of the foregoing, an object of this invention is to provide a moving image encoding method and apparatus which is capable of increasing coding efficiency even in a case of a prediction structure where two or more B-pictures exist between I- and P-pictures or between P-pictures, and also a moving image decoding method and apparatus which is capable of rendering a motion of an error corrected moving image better when a moving image signal is reproduced from data obtained by coding the moving image signal by a motion compensation predictive coding method.

The foregoing object and other objects of the invention have been achieved by the provision of a moving image encoding method and apparatus and a moving image decoding method and apparatus. The moving image encoding method and apparatus for encoding video signal having a predetermined picture unit of moving image signal by using a predetermined predictive video signal, comprises the steps of: calculating a distance for a time preceding past reference picture, and also a distance for a time following future reference picture by the video signal of a predetermined picture unit; and selecting the motion compensation predictive coding which is applied to the video signal of a predetermined picture unit in accordance with the calculated distances.

Further, the moving image decoding method and apparatus of this invention, comprises the steps of: decoding the video signal of a predetermined picture unit by motion compensation from a coded signal obtained by coding video signal of a predetermined picture unit of a moving image signal with the aid of a predetermined predictive video signal; calculating a distance for a time preceding past reference picture, and also a distance for a time following future reference picture by the video signal of a predetermined picture unit, in reproducing the moving image signal; and selecting a motion compensation mode with respect to the error detected video signal of predetermined picture unit in accordance with the calculated distances.

That is, according to this invention, the distance for a time preceding past reference picture and the distance for a time following future reference picture have been calculated by the video signal of a predetermined picture unit. These distances correspond to the degree of correlation of the past reference picture to the video signal of a predetermined picture unit and the degree of correlation of the future reference picture to the video signal of a predetermined picture unit. Therefore, if, for example, a higher degree of correlation (shorter distance) is selected, an error of selection can be reduced. If the error of selection is reduced, the coding efficiency of a moving image can be further enhanced and also the motion of an error corrected moving image can be made better.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A and 2B are diagrams explaining picture types where a single B-picture exists between I- and P-pictures or between P-pictures;

FIGS. 9A to 9F are diagrams explaining the output result of each processing section of the moving image encoding apparatus;

FIG. 15 is a diagram explaining the output result of each processing section of the moving image decoding apparatus.

DETAILED DESCRIPTION OF THE EMBODIMENT

Preferred embodiments of this invention will be described with referring to the accompanying drawings:

First, the principles of the moving image encoding method of this invention will be described.

Generally, in the case of moving images, the correlation of the time axis direction of video signals becomes smaller as the gap between two pictures become longer. As shown in FIGS. 2A and 2B, in the case of the prediction structure where a single B-picture exists between I- and P-pictures or between P-pictures, the correlation degrees of the forward prediction and the backward prediction of the B-picture are considered to be equal. Therefore, generally the statistical characteristics of the forward motion vector estimation error Ef and the backward motion vector estimation error Eb are equal.

Figure 1:
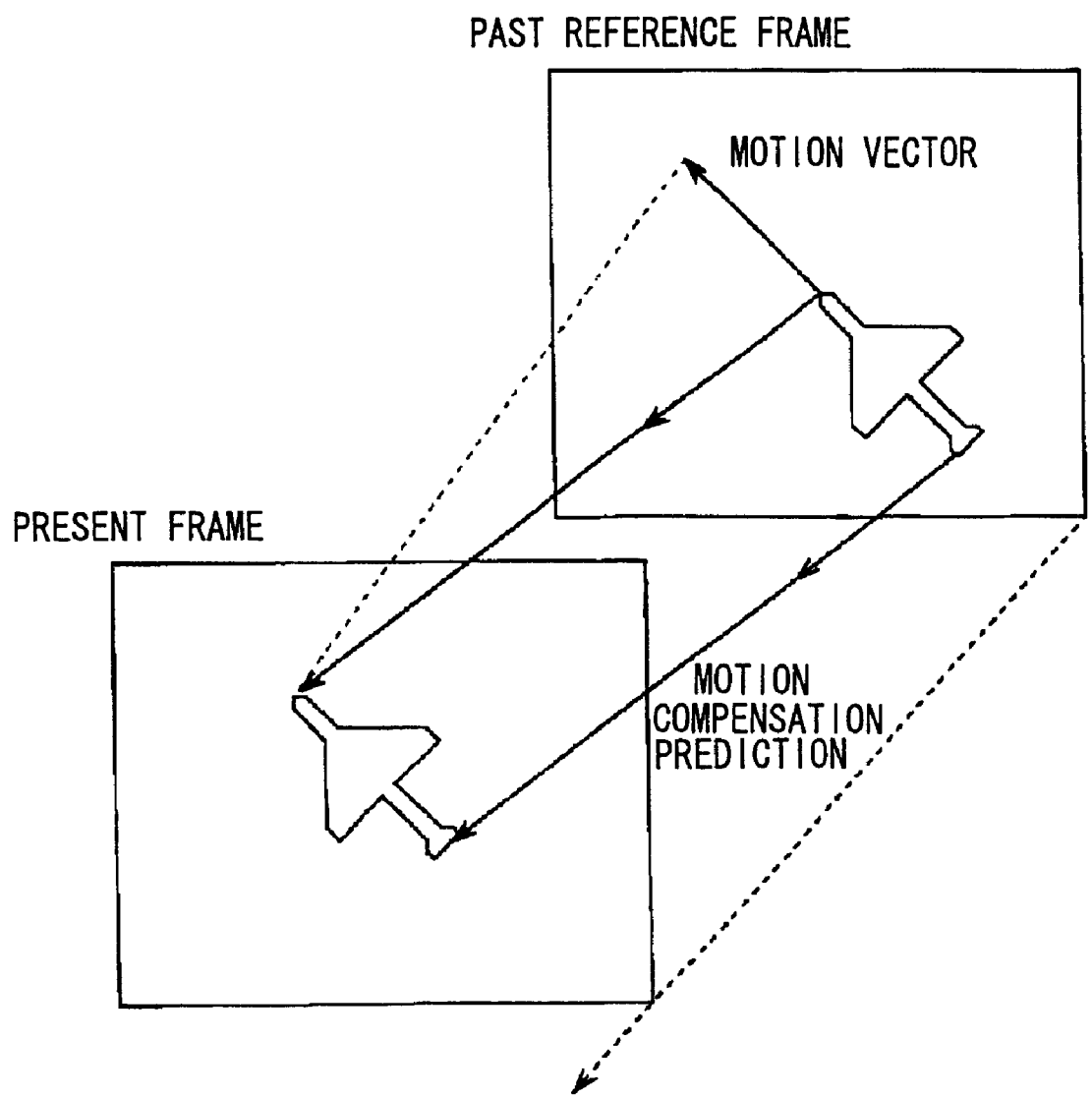
FIG. 1 is a diagram explaining the principles of motion prediction.
Figures 3A, 3B:
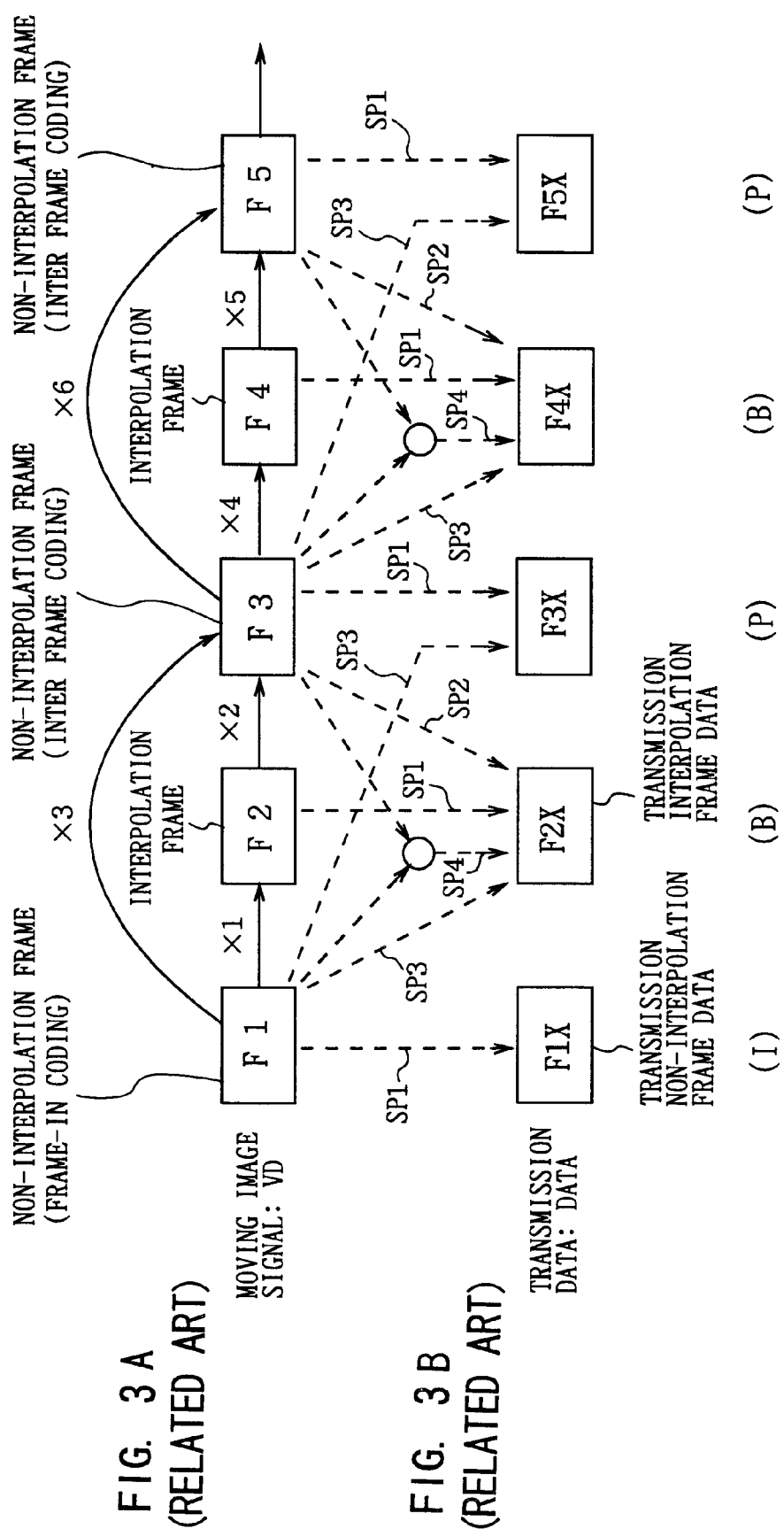
FIGS. 3A and 3B are diagrams explaining the principles of a moving image encoding method.
Figure 4:
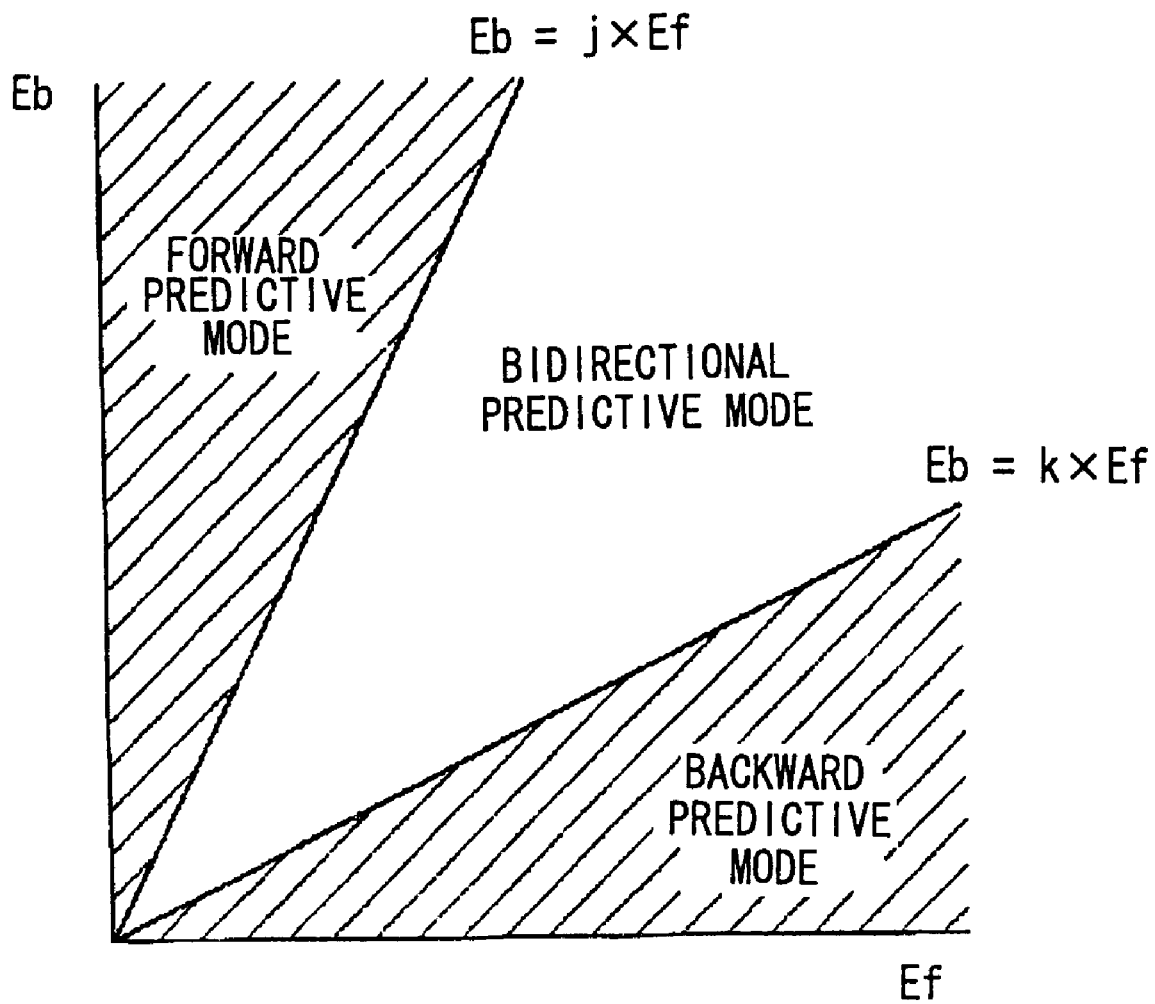
FIG. 4 is a diagram explaining the selecting method of a conventional non-intra coding.
Figure 5A:
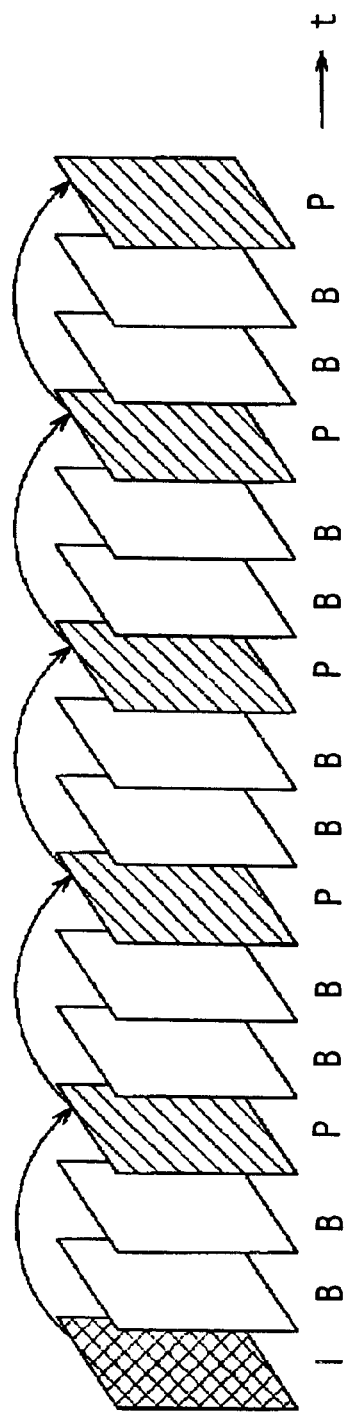
FIGS. 5A and 5B are diagrams explaining picture types where two B-pictures exist between I- and P-pictures or between P-pictures.
Figure 5B:
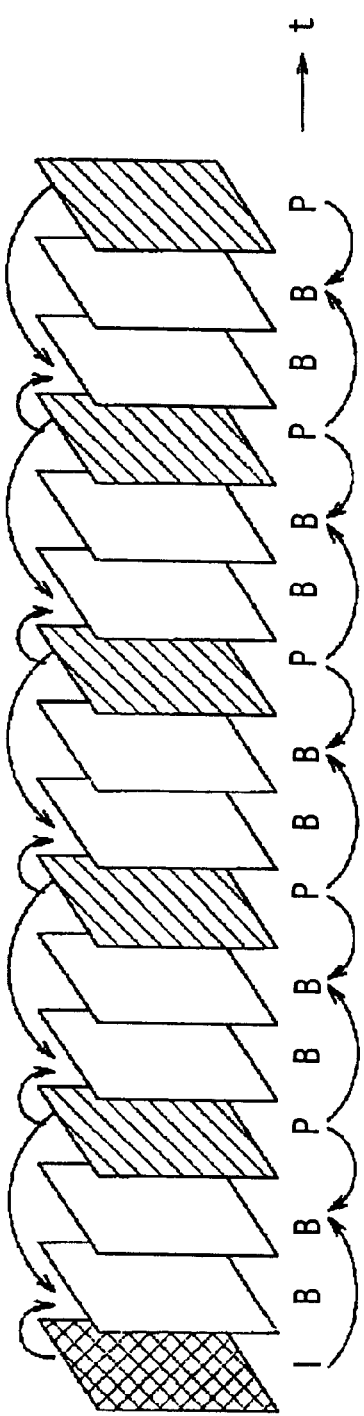
Figure 6A:
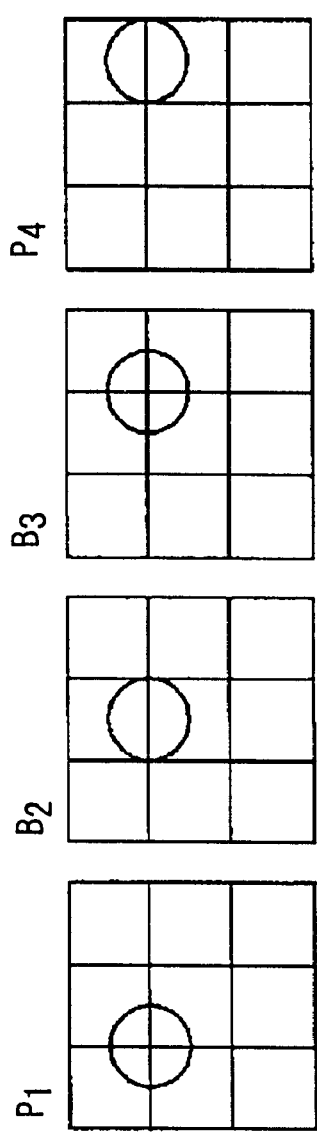
FIGS. 6A to 6C are diagrams explaining an error correction method performed in a conventional moving image coding.
Figure 6B:
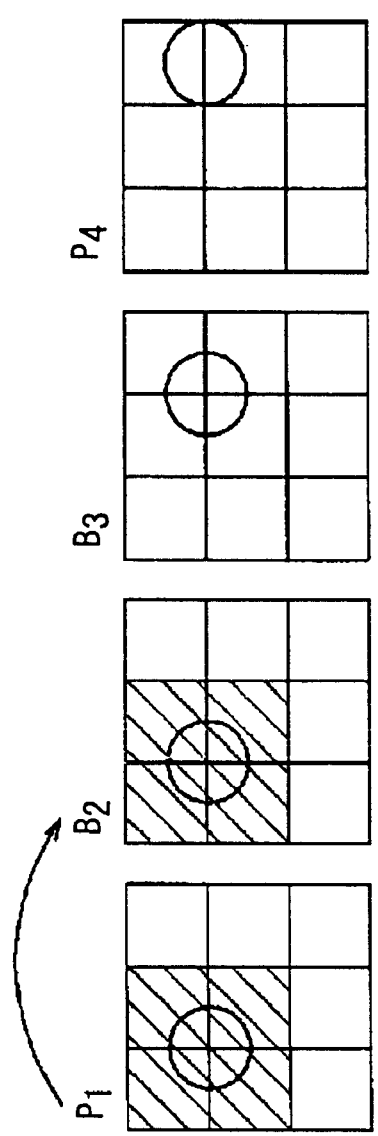
Figure 6C:
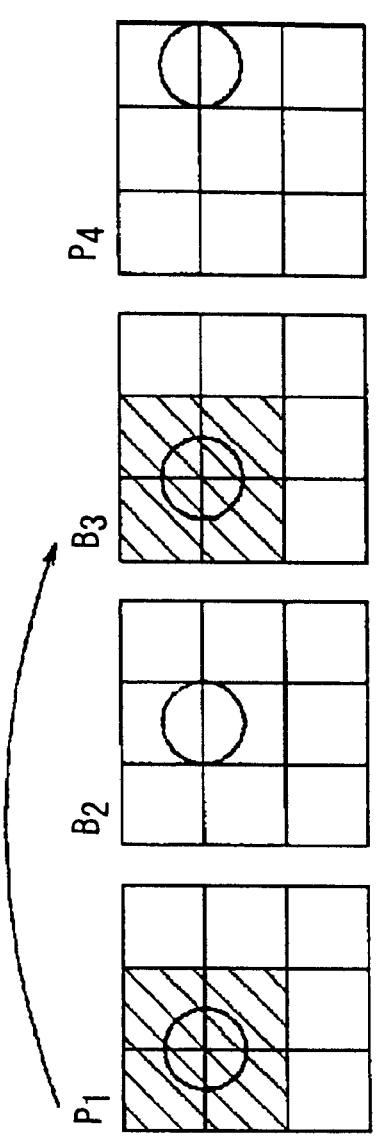
Figure 7:
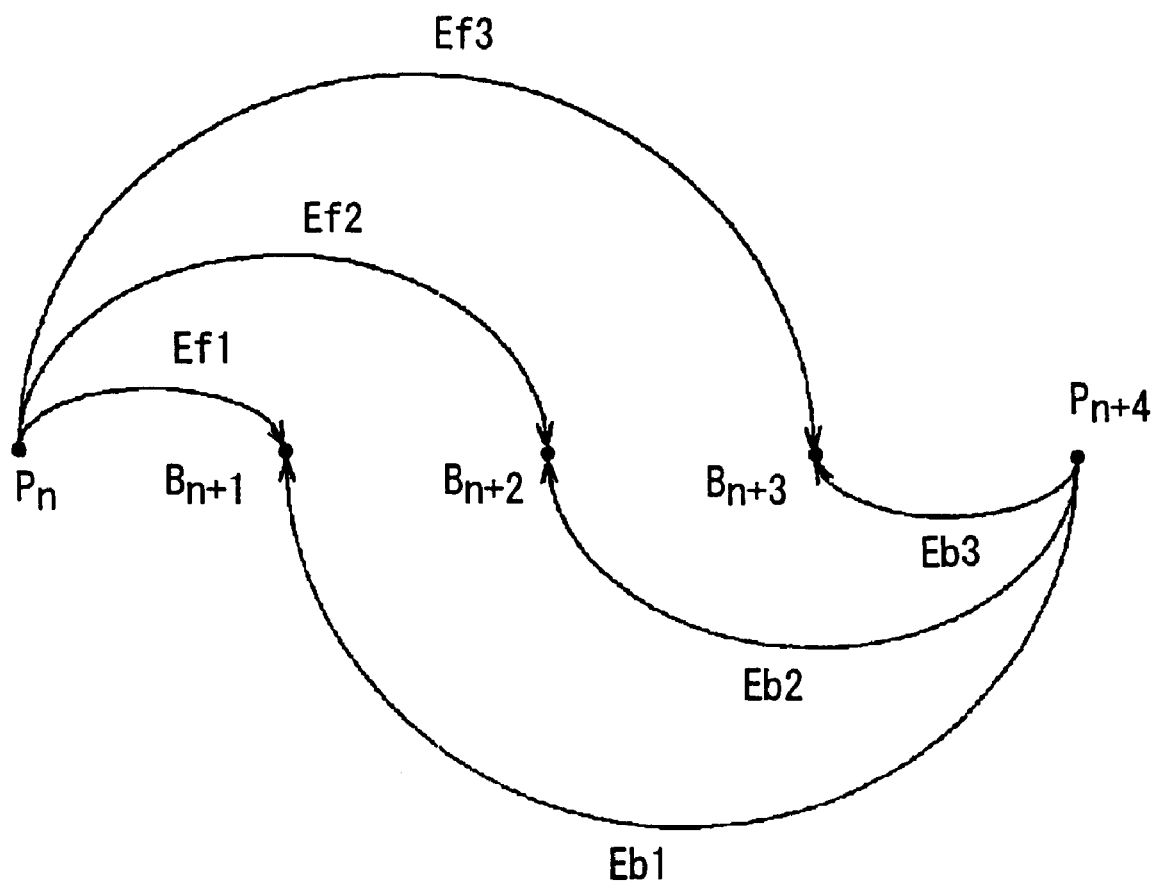
FIG. 7 is a diagram used to explain the motion vector estimation error of each B-picture in a case where a plurality of B-pictures exist between I- and P-pictures or between P-pictures.

On the other hand, as shown in FIGS. 5A and 5B, in the case of the prediction structure where two or more B-pictures exist between I- and P-pictures or between P-pictures, the correlation degree between the B-picture and the past reference picture, and the correlation degree between the B-picture and the future reference picture differ from each other. That is, as shown in FIG. 7, if the forward motion vector estimation of a B-picture $B_{n+1}$, a B-picture $B_{n+2}$, and a B-picture $B_{n+3}$ is performed with a P-picture $P_n$ being in the past point of time as a reference picture, then the vector estimation errors of the B-pictures, Ef1, Ef2, and Ef3, will become a relation of Ef1<Ef2<Ef3.

Likewise, if the backward motion vector estimation of the B-picture $B_{n+1}$, the B-picture $B_{n+2}$, and the B-picture $B_{n+3}$ is performed with a P-picture $P_{n+4}$ being in the past point of time as a reference picture, then the vector estimation errors of the B-pictures, Eb1, Eb2, and Eb3, will become a relation of Eb3<Eb2<Eb1.

Thus, in the case of the prediction structure where two or more B-pictures exist between I- and P-pictures or between P-pictures, the correlation degree between the B-picture and the past reference picture and the correlation degree between the B-picture and the future reference picture differ from each other, so the statistical natures of the forward motion vector estimation error and the backward motion vector estimation error differ from each other. That is, the correlation degree with the past reference picture and the correlation degree with the future reference picture depend upon the distance between the B-picture and the past reference picture and the distance between the B-picture and the future reference picture. Therefore, in the present invention, the coding of the B-picture is performed by adaptively switching the prediction coding of the B-picture in accordance with the distance between the B-picture and the past reference picture and the distance between the B-picture and the future reference picture. Note that the aforementioned distance can be considered as time.

Next, an example of the constitution of the moving image encoding apparatus of this invention to which the moving image coding method of this invention is applied will be described.

Figure 8:
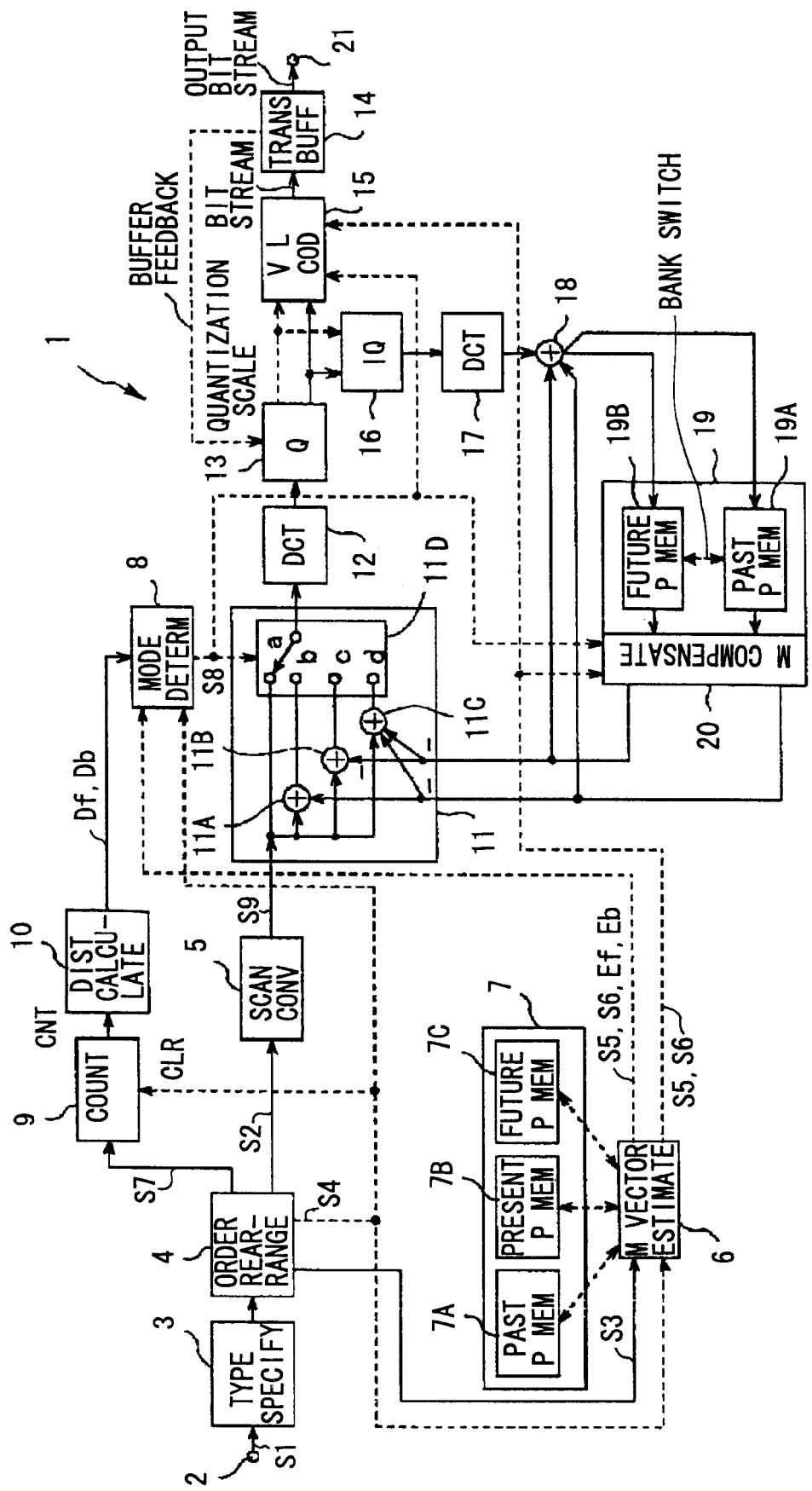
FIG. 8 is a block circuit diagram showing a moving image encoding apparatus according to a construction example of this invention.

The constitution example of the moving image encoding apparatus of this invention is shown in FIG. 8.

In the moving image encoding apparatus 1, a distance to a past reference picture and a distance to a future reference picture are calculated in coding a B-picture. Based on the calculated distances, it is determined which of a forward predictive mode, a backward predictive mode, and a bidirectionally predictive mode is selected. Note that the constitution example of FIG. 8 is constituted by a hybrid coding method where motion compensation prediction and discrete cosine transform (DCT) are combined.

In FIG. 8, an input moving image data S1, input from a terminal 2, is sent to a picture coding type specification circuit 3. In the picture coding type selection circuit 3, it is specified that as which picture of the I-, P-, and B-pictures the picture of each frame of the moving image data S1 serially being input is processed. As described in FIGS. 5A and 5B, the picture data of sixteen frames of frames F1 to F16 are considered as one unit of processing as a group of pictures (GOP).

That is, in the picture coding type specification circuit 3, with respect to the input picture data S1 which is input in order such as that shown in FIG. 9A, the leading head frame F1 of the GOP is specified as an I-picture $I_1$, the second and third frames F2 and F3 are specified as B-pictures $B_2$ and $B_3$, and the fourth frame F4 is specified as a P-picture $P_4$, as shown in FIG. 9B. The frame F5 to frame F16 are specified with repeated patterns of B-picture, B-picture, and P-picture, as shown in FIG. 9B.

If the picture type of each of the frames F1 to F16, i.e., the picture coding type is thus specified, in a picture coding order rearrangement circuit 4 the frame pictures are rearranged according to the specified coding type in coding order. The reason is that the B-picture cannot be coded if the I- or P-picture as a future reference picture is not provided ahead, because the B-picture requires backward prediction. That is, since the I- or P-picture must be previously coded before coding the B-picture, frame pictures of, for example, frames F1 to F16 are rearranged in the aforementioned picture coding rearrangement circuit 4. If the rearrangement of the frame pictures is performed, the order of the picture coding types will be rearranged as shown in FIG. 9C.

Figure 10A:
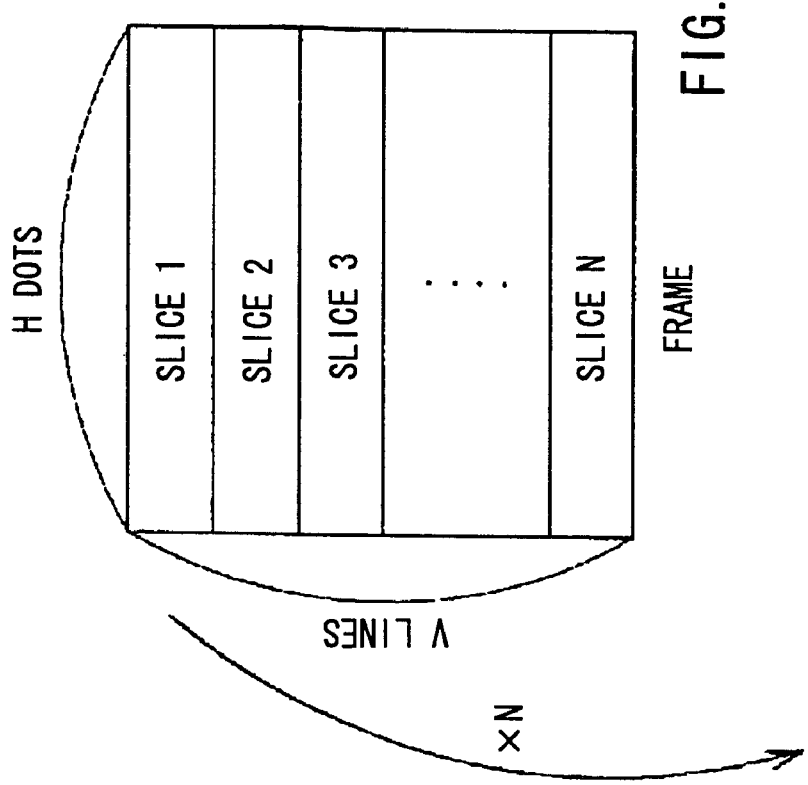
FIGS. 10A to 10C are diagrams explaining the structure of picture data.
Figure 10B:
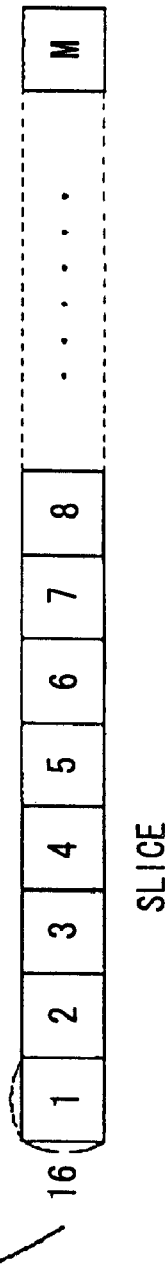
Figure 10C:
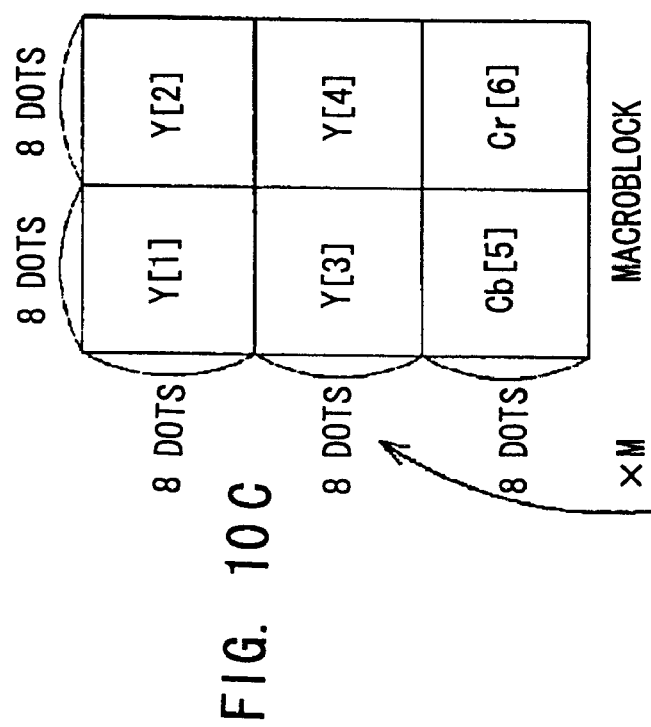

The picture data S2, rearranged at units of a frame by the aforementioned picture coding order rearrangement circuit 4, is sent to a scan converter 5 at intervals of a frame sequence. In the scan converter 5, the picture data which is input in raster-scan order is converted to block format data. That is, the picture data S2 which is input in raster-scan order is frame format data comprising V lines each containing H dots, as shown in FIG. 10A, and the scan converter 5 sections this one frame picture data into N slices each containing 16 lines, as shown in FIG. 10B, and further divides each slice into M macroblocks, as shown in FIG. 10C. Each macroblock comprises a brightness component corresponding to 16×16 pixels (dots) as shown in FIG. 10C, and this brightness component is sectioned into small blocks Y[1] to Y[4] each containing 8×8 dots. To this brightness component of 16×16 dots, a Cb component of 8×8 dots, Cb[5], and a Cr component of 8×8 dots, Cr[6], are added.

Furthermore, from the picture coding order rearrangement circuit 4, the present picture data and data of a past reference picture and/or a future reference picture, S3, are sent to a motion vector estimation circuit 6 to estimate a motion vector of the frame of the picture data S2 which is presently coded. To the motion vector estimation circuit 6, a picture coding type (information S4) in synchronization with each frame of the picture data S2 is also supplied from the aforementioned picture coding order rearrangement circuit 4. Therefore, in the motion vector estimation circuit 6, the picture data of each frame is processed as a I-picture, a P-picture, or a B-picture, based on the aforementioned picture coding type information S4.

That is, the picture data of a frame (e.g., frame F1), which is processed as an I-picture, is transmitted to and stored in a past reference picture storing section 7A of a frame memory 7 by means of the motion vector estimation circuit 6. The picture data of a frame (e.g., frame F2, frame F3), which is processed as a B-picture, is transmitted to and stored in a present reference picture storing section 7B. Also, the picture data of a frame (e.g., frame F4), which is processed as a P-picture, is transmitted to and stored in a future reference picture storing section 7C.

Now, when, at the next timing, the picture data of a frame (e.g., frame F1), which should be processed as the B-picture $B_5$ or $B_6$ of the frame F5 or F6 or as the P-picture $P_7$ of the frame F7, is input to the motion vector estimation circuit 6, the picture data of the first P-picture (in this case, frame F4) of the P-pictures which has so far been stored in the future reference picture storing section 7C is transmitted to a past reference picture storing Section 7A. Also, the picture data of the next B-picture (frame F5 or F6) is stored (overwritten) in the present reference picture storing section 7B, and the picture data of the next P-picture (frame F7) is stored (overwritten) in the future reference picture storing section 7C. An operation such as this is repeated in series.

The motion vector estimation circuit 6 outputs motion vector information S5 of forward prediction and also a signal of a motion vector estimation error (hereinafter referred to as a forward prediction error Ef) of the motion vector information S5. In the case of the B-picture, motion vector information S6 of backward prediction and also a signal of a motion vector estimation error (hereinafter referred to as a backward prediction error Eb) of the motion vector information S6 are output.

That is, in the motion vector estimation circuit 6, the sum of absolute values of a difference between a signal Aij of a macroblock of an object of coding and a signal Fij of a macroblock which is referred to by a forward motion vector is obtained as a forward prediction error Ef by the following equation (1).

$$Ef = \Sigma |Aij - Fij| \quad (1)$$

Also, in the motion vector estimation circuit 6, the sum of absolute values of a difference between a signal Aij of a macroblock of an object of coding and a signal Bij of a macroblock which is referred to by a backward motion vector is obtained as a backward prediction error Eb by the following equation (2).

$$Eb = \Sigma |Aij - Bij| \quad (2)$$

The motion vector estimation circuit 6 outputs these obtained forward prediction error Ef and backward prediction error Eb to a predictive mode determination circuit 8, together with the motion vector information S5 and the motion vector information S6.

The picture coding order rearrangement circuit 4 also outputs a frame synchronous signal S7 to a counter 9. In the counter 9, the number of output frames is counted based on the frame synchronous signal S7. The count value CNT of the counter 9 is reset to "0" when the picture coding type information S4, input to the counter 9, indicates an I-picture or a P-picture. That is, this counter 9 counts the number of B-pictures which are input between an I-picture and a P-picture or between P-pictures. Therefore, in the case of this structure, the counter 9 outputs "0", "1", or "2" as a count value CNT, as shown in FIG. 9D. The count value CNT is sent to an inter picture distance calculation circuit 10 for motion vector estimation.

Based on the count value CNT of the B-picture, as shown in FIGS. 9E and 9F, the inter picture distance calculation circuit 10 calculates a distance Df between the B-picture and a past reference picture and also a distance Db between the B-picture and a future reference picture. The calculated distances are output to the predictive mode determination circuit 8.

The predictive mode determination circuit 8 is a circuit for selecting a predictive mode of a macroblock and determines which predictive mode is selected the intra mode, the forward predictive mode, the backward predictive mode, or the bidirectionally predictive mode. That is, the picture coding type information S4 from the aforementioned picture coding type order rearrangement circuit 4 is supplied to the predictive mode determination circuit 8, and when the picture coding type information S4 indicates an I-picture, the predictive mode determination circuit 8 selects the intra mode. When, on the other hand, the picture coding type information S4 indicates a P-picture, the predictive mode determination circuit 8 determines which predictive mode is selected the intra mode or the forward predictive mode, as follows.

Concretely speaking, the predictive mode determination circuit 8 obtains the sum of absolute values of a difference between a signal Aij of a macroblock of an object of coding and an average value Aav of the signal Aij of the macroblock, as the sum of absolute values of prediction errors during intra prediction, Eintra, by the following equation (3).

$$Eintra = \Sigma |Aij - Aav| \quad (3)$$

Then, the predictive mode determination circuit 8 compares the sum of absolute values of prediction errors during intra prediction, Eintra, with the forward prediction error Ef which is input by the motion vector estimation circuit 6. When Eintra<Ef, the intra mode is selected, and in the case other than this, the forward predictive mode is selected.

Figure 11A:
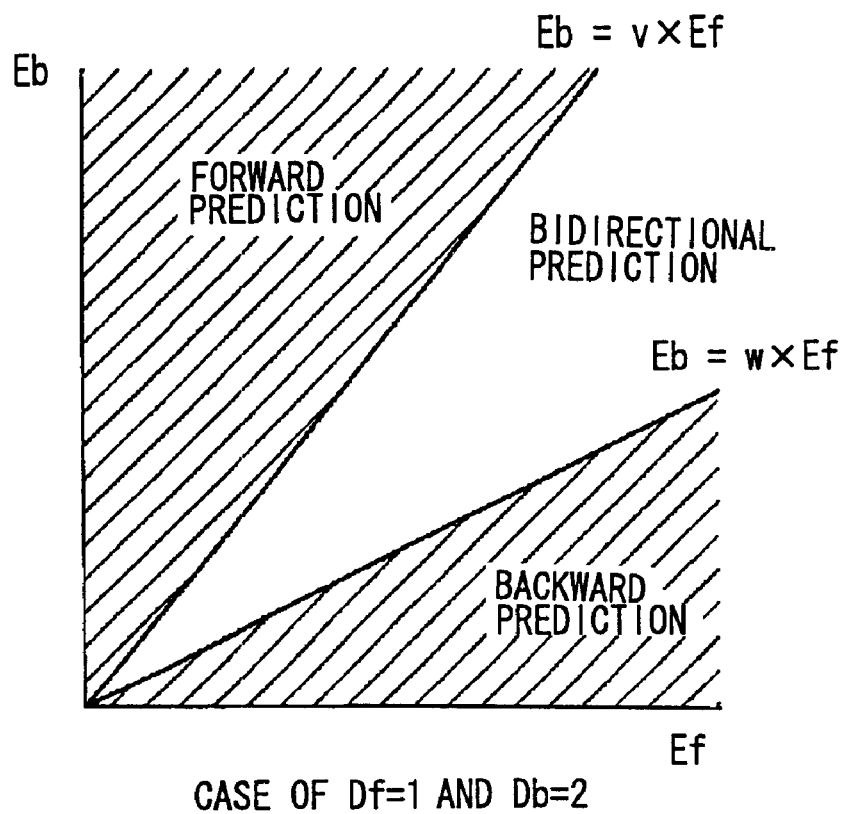
FIGS. 11A and 11B are diagrams explaining a method of selecting non-intra coding.
Figure 11B:
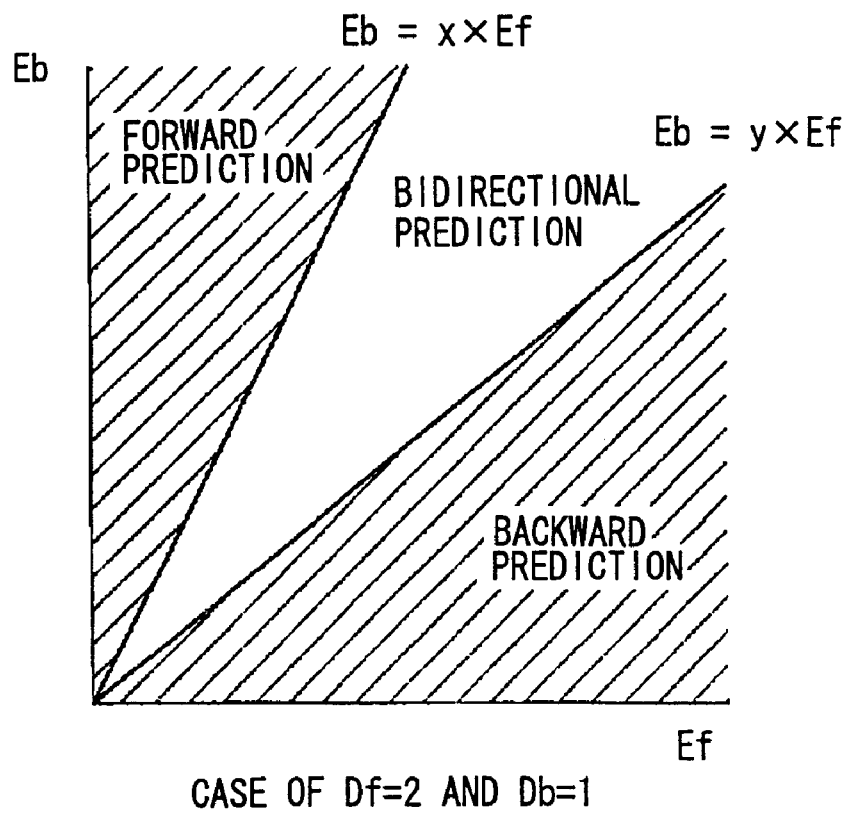

Also, when the picture coding type information S4 indicates a B-picture, the predictive mode determination circuit 8 determines which predictive mode is selected, among the intra mode, the forward predictive mode, the backward predictive mode, or the bidirectionally mode, as follows. Initially, the predictive mode determination circuit 8 selects a single predictive mode from among the forward predictive mode, the backward predictive mode, and the bidirectionally mode which are non-intra modes. This control is performed, for example, as shown in FIGS. 11A and 11B, based on the information of the distance Df with respect to the past reference picture and the information of the distance Db with respect to the future reference picture, obtained by the inter picture distance calculation circuit 10, and based on the information of the motion vector estimation errors Ef and Eb.

That is, in a case where the present picture is close in distance to the past reference picture (case of Df=1 and Db=2), when Eb>v×Ef, the forward predictive mode is selected, and when Eb<w×Ef, the backward predictive mode is selected. When v×Ef≦Eb≦w×Ef, the bidirectionally predictive mode is selected. In these equations, coefficients v and w are, for example, v=4/3 and w=1/2. In this case, an area where the forward predictive mode is selected becomes larger as compared with the conventional method.

Next, in a case where the present picture is close in distance to the future reference picture (case of Df=2 and Db=1), when Eb>x×Ef, the forward predictive mode is selected, and when Eb<y×Ef, the backward predictive mode is selected. When x×Ef≦Eb≦y×Ef, the bidirectionally predictive mode is selected. In these equations, coefficients x and y are, for example, x=2 and y=3/4. In this case, an area where the backward predictive mode is selected becomes larger as compared with the conventional method.

Let the prediction error of the thus selected non-intra predictive mode be Einter. In this case, when the selected non-intra predictive mode is the bidirectionally predictive mode, let the prediction error of the non-intra predictive mode be Einter and an average value of Ef and Eb is used. Therefore, in the case of the forward predictive mode, Einter becomes equal to Ef. In the case of the backward predictive mode, Einter becomes equal to Eb. In the case of the bidirectionally predictive mode, Einter becomes equal to (Ef+Eb)/2.

Next, it is determined which mode is selected the selected non-intra predictive mode or the intra mode. The sum of absolute values of a difference between a signal Aij of a macroblock of an object of coding and an average value Aav of the signal Aij of the macroblock is obtained as the sum of absolute values of prediction errors during intra prediction, Eintra, by equation (3). The sum of absolute values of prediction errors during intra prediction, Eintra, is compared with the sum of absolute values of prediction errors in the selected non-intra predictive mode, Einter. As a result, when Eintra<Einter, the intra mode is selected, and in the case other than this, the non-intra predictive mode is selected.

Thus, in the moving image encoding apparatus 1, the predictive coding of the B-picture is selected, giving consideration to the fact that the correlation degree with the past reference picture and the correlation degree with the future reference picture depend upon the distance between the B-picture and the past reference picture and the distance between the B-picture and the future reference picture. Therefore, even if the statistical characteristics of the forward motion vector estimation error and the backward motion vector estimation error were different from each other, the coding efficiency of a moving image could be greatly enhanced because the forward predictive coding, the backward predictive coding, or the bidirectionally predictive coding can be adaptively selected according to the difference in the statistical characteristics.

The information S8 of the predictive mode, selected as described above in the aforementioned mode determination circuit 8, is sent to an arithmetic section 11. In the arithmetic section 11, the calculation of the intra, the forward prediction, the backward prediction, or the bidirectional prediction is performed with respect to macroblock data S9 read out of the scan converter 5, based on the predictive mode information S8 sent by the predictive mode determination circuit 8.

When the picture data of a frame to be processed as an I-picture is input to the arithmetic section 11 as macroblock data S9, the switch 11D of the arithmetic section 11 is switched to its switching terminal "a" side so that the intra coding is set as a predictive mode.

Thus, the picture data of the I-picture is input to a discrete cosine transform (DCT) circuit 12, in which the picture data is processed by DCT and converted to a DCT coefficient. This DCT coefficient is sent to a quantization circuit 13. In the quantization circuit 13, the DCT coefficient is quantized with a quantization scale (quantization step) corresponding to the data stored quantity (buffer stored quantity) of a second-stage transmission buffer 14 and then is sent to a variable length coding circuit 15.

The variable length coding circuit 15, in correspondence with the information of the quantization scale which is input by the quantization circuit 13, converts the picture data sent by the quantization circuit (in this case, quantintization data of I-picture) to variable length code such as Huffman code and also outputs the converted code to the transmission buffer 14. The variable length coding circuit 15 also converts the information of the aforementioned quantization scale, the predictive mode information S8 input by the predictive mode determination circuit 8, and the motion vector information S5 and S6 input by the motion vector estimation circuit 6 to variable length code.

The transmission buffer 14 temporarily stores the data, input by the aforementioned variable length coding circuit 15, and feeds data corresponding to this stored quantity back to the quantization circuit 13 as a quantization control signal. That is, if the remaining quantity of the data storage increases up to an allowable upper limit value, the transmission buffer 14 will increase the quantization scale of the aforementioned quantization circuit 13 by the quantization control signal so that the data quantity of the quantity data is reduced. Also, if the remaining quantity of the data storage reduces to an allowable lower limit value, the transmission buffer 14 will reduce the quantization scale of the quantization circuit 13 by the quantization control signal so that the data quantity of the quantity data is increased. In this way, the overflow or underflow of the transmission buffer 14 is prevented. The data stored in the transmission buffer 14 is read out at a predetermined timing and is output through an output terminal 21 to a transmission path.

On the other hand, the picture data of the I-picture, output by the quantization circuit 13, is input to an inverse quantization circuit 16. In the inverse quantization circuit 16, the picture data is inverse-quantized with the information of the quantization scale supplied by the quantization circuit 13. An output of the inverse quantization circuit 16 is input to an inverse discrete cosine transform (IDCT) circuit 17 and is processed by inverse discrete cosine transform. The processed data is then supplied to and stored in a past reference picture storing section 19A of a frame memory 19 through an arithmetic unit 18.

Now, a case where the picture data of a frame to be processed as a P-picture is input by the scan converter 5 will be described. As described above, in the arithmetic section 11, when the predictive mode information S8 indicates the intra mode, the switch 11D is switched to the switching terminal "a" side. Therefore, this picture data, as with the data of the I-picture, is transmitted through the DCT circuit 12, the quantization circuit 13, the variable length coding circuit 15, and the transmission buffer 14 to the transmission path. Also, the data through the quantization circuit 13 is supplied through the inverse quantization circuit 16, the IDCT circuit 17, and the arithmetic unit 18 to a future reference picture storing section 19B of the frame memory 19 and is stored.

When, on the other hand, the predictive mode information S8 indicates the forward predictive mode, the switch 11D is switched to a switching terminal "b" side and also the picture data (in this case, I-picture) stored in the past reference picture storing section 19A of the frame memory 19 is read out. The picture data, read out, is motion-compensated in the motion compensation circuit 20 by use of the forward motion vector information S5 input by the motion vector estimation circuit 6.

That is, the motion compensation circuit 20, when the specification of the forward predictive mode is instructed by the predictive mode determination circuit 8, shifts the read address of the past reference picture storing section 19A by an amount corresponding to the motion vector information S5 at a position corresponding to the position of the macroblock being now output by the motion vector specification circuit 6 and then reads out data to generate predictive picture data.

The motion compensated predictive picture data in the motion compensation circuit 20 is sent to an arithmetic unit 11A. The arithmetic unit 11A subtracts predictive picture data corresponding to the macroblock of the reference picture supplied by the motion compensation circuit 20 from the data of the macroblock supplied by the scan converter 5, and then outputs differential data as a prediction error. This differential data is sent through the DCT circuit 12, the quantization circuit 13, the variable length coding circuit 15, and the transmission buffer 14 to the transmission line. The differential data is also locally decoded by the inverse quantization circuit 16 and the IDCT circuit 7 and is sent to the arithmetic unit 18.

To the arithmetic unit 18, the same data as the predictive picture data supplied by the arithmetic unit 11A is input by the motion compensation circuit 20. In the arithmetic unit 18, the predictive picture data supplied by the motion compensation circuit 20 is added to the differential data supplied by the IDCT circuit 17. Thus, the locally decoded picture data of the P-picture is obtained. This picture data of the P-picture is supplied to and stored in the future reference picture storing section 19B of the frame memory 19.

Now, a case where the picture data of a frame to be processed as a B-picture is input by the scan converter 5 will be described. As described above, when the predictive mode information S8 indicates the intra mode or the forward predictive mode, the switch 11D is switched to the switching terminal "a" side or the switching terminal "b" side. The processing at this time is performed in the same way as the case of the P-picture, and the data is transmitted. When, on the other hand, the predictive mode information S8 indicates the backward predictive mode or the bidirectionally predictive mode, the switch 11D is switched to a switching terminal "c" side or a switching terminal "d" side.

In the case of the backward predictive mode where the switch 11D is switched to the switching terminal "c" side, the picture stored in the future reference picture storing section 19B (in this case, P-picture) is output. The picture data, read out, is motion-compensated in the motion compensation circuit 20 by use of the backward motion vector information S6 input by the motion vector estimation circuit 6.

That is, the motion compensation circuit 20, when the setting of the backward predictive mode is instructed by the predictive mode determination circuit 8, shifts the read address of the future reference picture storing section 19B by an amount corresponding to the motion vector information S6 at a position corresponding to the position of the macroblock being now output by the motion vector specification circuit 6 and then reads out data to generate predictive picture data.

The motion compensated predictive picture data in the motion compensation circuit 20 is sent to an arithmetic unit 11B. The arithmetic unit 11B subtracts, from the data of the macroblock supplied by the scan converter 5, the predictive picture data corresponding to that macroblock supplied by the motion compensation circuit 20, and then outputs differential data. This differential data is sent through the DCT circuit 12, the quantization circuit 13, the variable length coding circuit 15, and the transmission buffer 14 to the transmission line. The differential data, output by the quantization circuit 13, is also locally decoded by the inverse quantization circuit 16 and the IDCT circuit 17 and is sent to the arithmetic unit 18.

To the arithmetic unit 18, the same data as the predictive picture data supplied by the arithmetic unit 11B is input by the motion compensation circuit 20. In the arithmetic unit 18, the predictive picture data supplied by the motion compensation circuit 20 is added to the differential data supplied by the IDCT circuit 17. Thus, the locally decoded picture data of the B-picture is obtained.

Next, in the case of the bidirectionally predictive mode where the switch 11D is switched to the switching terminal "d" side, the picture stored in the past reference picture storing section 19A (in this case, I-picture) is output and also the picture stored in the future reference picture storing section 19B (in this case, P-picture) is output. The picture data, read out, is motion-compensated in the motion compensation circuit 20 by use of the forward motion vector information S5 and S6 input by the motion vector estimation circuit 6.

That is, the motion compensation circuit 20, when the setting of the bidirectionally predictive mode is instructed by the predictive mode determination circuit 8, shifts the read addresses of the past reference picture storing section 19A and the future reference picture storing section 19B by an amount corresponding to the motion vector information S5 and S6 at a position corresponding to the position of the macroblock being now output by the motion vector specification circuit 6 and then reads out data to generate predictive picture data.

The motion compensated predictive picture data in the motion compensation circuit 20 is sent to an arithmetic unit 11C. The arithmetic unit 11C subtracts, from the data of the macroblock supplied by the scan converter 5, an average of the predictive picture data corresponding to that macroblock supplied by the motion compensation circuit 20, and then outputs differential data. This differential data is sent through the DCT circuit 12, the quantization circuit 13, the variable length coding circuit 15, and the transmission buffer 14 to the transmission line. The differential data through the quantization circuit 13 is also locally decoded by the inverse quantization circuit 16 and the IDCT circuit 17 and is sent to the arithmetic unit 18.

To the arithmetic unit 18, the same data as the predictive picture data supplied by the arithmetic unit 11C is input by the motion compensation circuit 20. In the arithmetic unit 18, the predictive picture data supplied by the motion compensation circuit 20 is added to the differential data supplied by the IDCT circuit 17. Thus, the locally decoded picture data of the B-picture is obtained. Note that the B-picture is not stored in the frame memory 19 because it is not used as predictive pictures of other pictures.

In the frame memory 19, the past reference picture storing section 19A and the future reference picture storing section 19B can be bank-switched as needed. Therefore, with respect to a predetermined reference picture, the picture data, stored in the past reference picture storing section 19A or the future reference picture storing section 19B, can be switched and output as a past reference picture or a future reference picture.

In the constitution described above, in coding a moving image signal with the aid of a predetermined predictive video signal by motion compensation predictive coding, a distance between video signal of a predetermined picture unit and a time preceding past reference picture is calculated, and also a distance between video signal of a predetermined picture unit and a time following future reference picture is calculated. According to the calculated distances, motion compensation predictive coding which is applied to the video signal of a predetermined picture unit is selected and the present picture is coded.

According to the aforementioned constitution, the distance Df between the B-picture and a past reference picture and the distance Db between the B-picture and a future reference picture are calculated. In the case where the present picture is close in distance to the past reference picture and the case where the present picture is close in distance to the past reference picture, the predictive coding of the macroblock is selected based on the forward prediction error Ef and the backward prediction error Eb. Thereby, a possibility of selecting a bidirectionally predictive mode when coding efficiency is bad is reduced and therefore the coding efficiency of a moving image can be greatly enhanced.

While in the aforementioned embodiment a description has been made of a case where the brightness block is used as a macroblock, the present invention is not limited to this. A color difference block can be used as a macroblock. The color difference block is processed in the same way as the brightness block and is transmitted. The motion vector, which is used when the color difference block is processed, is a vector where a motion vector of a corresponding brightness block is reduced by half in the vertical and horizontal directions.

Further, while in the aforementioned embodiment a description has been made of a case where, when Df=1 and Db=2, the coefficients v and w by which the forward prediction error Ef is multiplied are set to v=4/3 and w=1/2 and where, when Df=2 and Db=1, the coefficients x and y by which the forward prediction error is multiplied are set to x=2 and y=3/4, the present invention is not limited to this. These coefficients v, w, x, and y can be set to other values. Thereby, the selection of the predictive coding can be more adaptively controlled. Also, this invention is not limited to the linear relational expression shown in FIGS. 11A and 11B, and the non-linear relational expression can be used. Therefore, the selection of predictive coding can be magnificently adaptively controlled.

Next, the principles of the error correction in the moving image decoding method of this invention will be described.

As described above, in the case of the moving image, the correlation of the time axis direction of video signals depends upon a distance (time) between two pictures.

Therefore, even when the motion compensation prediction coded data of a moving image signal is decoded, it is also effective to switch the error correction method of the B-picture in accordance with the distance between the B-picture and the past reference picture or the future reference picture. In other words, since a strong correlation means less variation in a moving image, the motion of an error corrected moving image can be made better than the conventional method and a deterioration in picture quality can be made inconspicuous, by correcting an error with a reference picture whose correlation is strong. That is, in the moving image decoding method of the present invention, when an error of the B-picture is corrected, the distance to a past reference picture and the distance to a future reference picture of motion compensation are calculated, and based on the calculated values, the error correction method is adaptively changed.

Figure 12A:
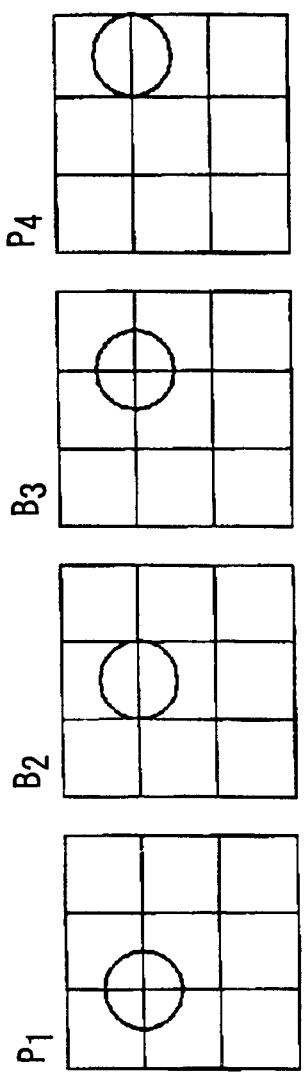
FIGS. 12A to 12C are diagrams explaining an error correction method in a moving image decoding method of this invention.
Figure 12B:
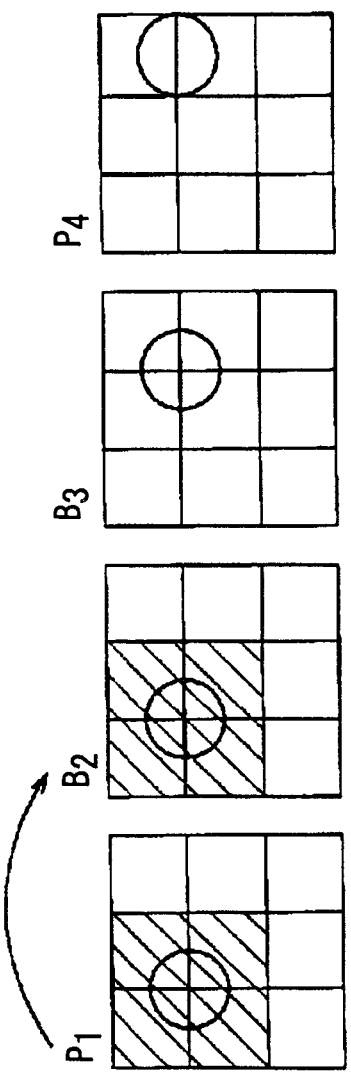
Figure 12C:
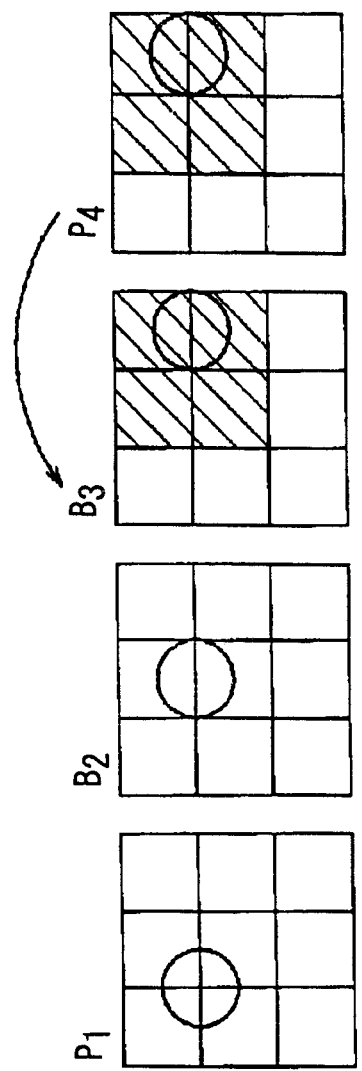

With FIGS. 12A to 12C, the error correction method in the moving image decoding method of the present invention will be more concretely described. For example, in arbitrary pictures, B-pictures $B_2$ and $B_3$ are between P-pictures $P_1$ and $P_4$, as shown in FIGS. 12A to 12C, and it is assumed that, when pictures are normally decoded, pictures such as those shown in FIG. 12A are obtained. In the error correction method in the moving image decoding method of the present invention, when an error occurs in the hatched portion of the B-picture $B_2$, as shown, for example, in FIG. 12B, the P-picture $P_1$ close in distance to the B-picture $B_2$ is selected and the macroblocks of the hatched portion of the B-picture $B_2$ are replaced with the macroblocks of the hatched portion of the P-picture $P_1$ corresponding to the hatched portion of the B-picture $B_2$. On the other hand, for example, when the P-pictures $P_1$ and $P_4$ are normally decoded and then the decoding of the macroblocks of the hatched portion of the B-picture $B_3$ becomes impossible, as shown in FIG. 12C, the P-picture $P_4$ close in distance to the B-picture $B_3$ is selected and the macroblocks of the hatched portion of the B-picture $B_3$ are replaced with the macroblocks of the hatched portion of the P-picture $P_4$ corresponding to the hatched portion of the B-picture $B_3$, that is, replaced with the macroblocks of P-picture in the same address as that of the macroblocks of B-picture of which error is detected. For macroblocks where an error is corrected (i.e., hatched portion of the B-picture $B_2$ or $B_3$), the motion vector is reset to "0", the prediction error is set to "0", and then a motion compensation is made with the past reference picture (i.e., hatched portion of the picture $P_1$ or $P_4$), as described above.

With the aforementioned method, the motion of a moving image would not go backward unlike the prior art, even if an error correction were made in the pictures flowing in order of P-picture $P_1$, B-picture $B_2$, B-picture $B_3$, and P-picture $P_4$. Therefore, even when the motion of the moving image is a horizontal motion such as a pan operation in the operation of a camera, it becomes possible to obtain a picture where a satisfactory error correction has been made.

Next, the constitution of the moving image decoding apparatus of this invention to which the moving image decoding method of this invention is applied will be described, while referring to FIG. 13. The embodiment of FIG. 13 also uses a structure which decodes data coded by a hybrid coding method where motion compensation prediction and discrete cosine transform (DCT) are combined.

Initially, the operation of the decoding apparatus where no error correction of a picture is made (error correction is not needed) will be described.

Figure 13:
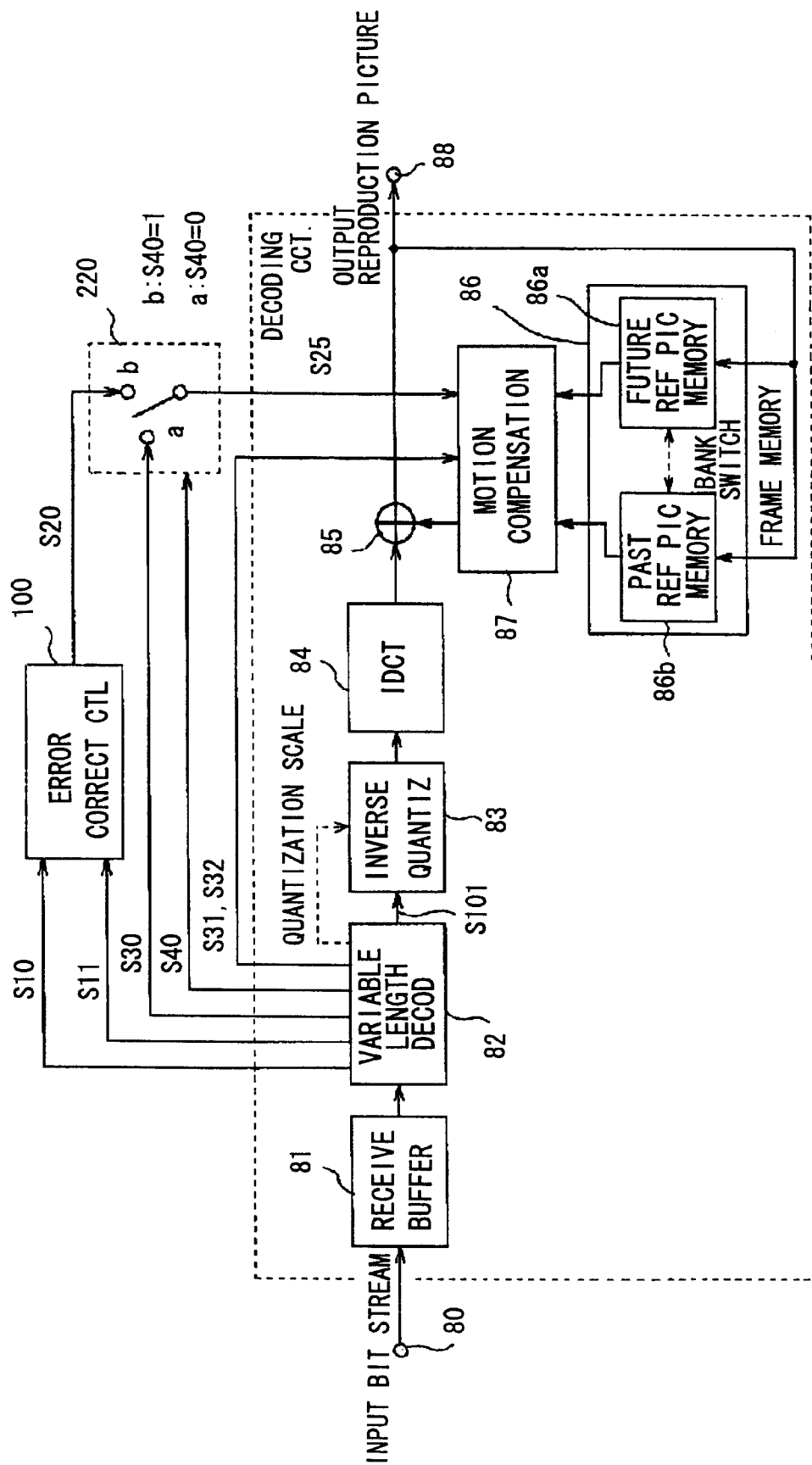
FIG. 13 is a block circuit diagram showing a moving image decoding apparatus according to a construction example of this invention.

In FIG. 13, the bit stream of the coded data, reproduced by a reproducing unit after it is received in a reception circuit (not shown) or stored once in a recording medium, is supplied through an input terminal 80 to a decoding circuit of the moving image decoding apparatus. The coded data is temporarily stored in a reception buffer 81 and then is supplied to a variable length decoding (VLD) circuit 82.

The variable length decoding (VLD) circuit 82 decodes the data supplied from the reception buffer 81, by a decoding process corresponding to the variable length coding during the aforementioned moving image coding. Quantization data S101 and quantization scale (quantization step) information of the present macroblock of an object to be coded, obtained by the decoding process in the variable length decoding circuit 82, are input to an inverse quantization circuit 83. Also, forward prediction motion vector information S31 and backward prediction motion vector information S32 at the time of coding, obtained by the decoding process of the variable length decoding circuit 82, are sent to a motion compensation circuit 87. Furthermore, the predictive mode information at the time of coding, obtained by the variable length decoding circuit 82, i.e., motion compensation mode information corresponding to the motion compensation method is sent to the switching terminal "a" side of a switch 220. The switch 220 is operated by an error flag (switching control signal) S40 which is output by the variable length decoding circuit 82, and is switched to its switching terminal-a. An output signal S25 of the switch 220 (in this case, motion compensation mode information S30 from the aforementioned variable length decoding circuit 82) is sent to a motion compensation circuit 87.

Also, the aforementioned inverse quantization circuit 83 inverse-quantizes the quantization data S101 supplied from the variable length decoding circuit 82, in accordance with the quantization scale supplied from the variable length decoding circuit 82, and the inverse quantized data is input to the inverse discrete cosine transform (IDCT) circuit 84. The data (i.e., DCT coefficient), output from this inverse quantization circuit 83, is processed with inverse discrete cosine transform by means of the aforementioned IDCT circuit 84 and then is input to an arithmetic unit 85.

Next, a case where the picture data of sixteen frames F1 to F16 is considered as a group of pictures (GOP) which is one unit of processing will be described, as described in FIGS. 5A and 5B, and the motion compensation prediction coded data is decoded.

Initially, the coded data of the leading frame F1, i.e., I-picture is decoded. The data of the macroblock supplied from the IDCT circuit 84 is not processed in the arithmetic unit 85 and is stored in the future reference picture storing section 86a of a frame memory 86. The I-picture (frame F1) stored in this future reference picture storing section 86a is used as reference picture data for motion compensation with respect to the macroblock of the P-picture (i.e. frame F4) or the B-picture (i.e., frames F2 and F3) which is going to be input to the arithmetic unit 85.

Then, when the P-picture (frame F4) or the I-picture is input, in the frame memory 86 the bank switching is performed and the picture data, stored in the past reference storing section 86b or the future reference picture storing section 86a, is switched and output.

That is, when the macroblock data of the P-picture (frame F4) is supplied from the IDCT circuit 84 and the motion compensation mode information S30 (signal S25 through the switch 220) at that time indicates forward prediction, the decoded picture data, which has been stored in the past reference picture storing section 86b of the frame memory 86, is read out and also the data of the reference macroblock, obtained by the motion compensation of the motion compensation circuit 87 which used the forward vector information S31 output from the variable length decoding circuit 82, is read out.

Then, in the arithmetic unit 85, the data of the reference macroblock supplied by the aforementioned motion compensation circuit 87 and the macroblock data (differential data) supplied by the IDCT circuit 84 are added. This added data, i.e., the data of the decoded P-picture is stored in the future reference picture storing section 86a of the frame memory 86 as reference picture data for motion compensation of the macroblock of the next B-picture (i.e. frames F2 and F3) or the next P-picture (i.e., frame F7). Note that, when the macroblock data of the P-picture is the data processed by intra coding, the data is not processed in the arithmetic unit 85 and the data, as it is, is stored in the future reference picture storing section 86a.

If the P-picture or I-picture is decoded, then the picture (frame F1) data, which has been stored in the past reference picture storing section 86b of the frame memory 86, will be read out and output from the output terminal 88 through the motion compensation circuit 87 and the arithmetic unit 85. Note that, since the P-picture (frame F4) data is picture data which should be displayed next to the B-picture (frames F2 and F3) which will be input in the future, the data is not output, at this point of time, from the output terminal 88.

Then, when the macroblock data of the B-picture (frame F2 or F3) is output from the IDCT circuit 84, the picture data which has been stored in the frame memory 86 is read out according to the motion compensation mode information S30 at that time and is input to the arithmetic unit 85.

Now, when the aforementioned motion compensation mode information S30 indicates the forward predictive mode, the reference macroblock data corresponding to the forward motion vector information S31 is read from the decoded picture data which have been stored in the past reference picture storing section 86b. When, on the other hand, the motion compensation mode information S30 indicates the backward predictive mode, the reference macroblock data corresponding to the backward motion vector information S32 is read from the decoded picture data which have been stored in the future reference picture storing section 86a. Furthermore, when the motion compensation mode information S30 indicates the bidirectionally predictive mode, the reference macroblock data corresponding to the motion vector information S31 and S32 is read from the past reference picture storing section 86a and the future reference picture storing section 86b. The addition-average macroblock of the two reference macroblocks thus read out becomes an output of the motion compensation circuit 87. Note that, in the case of the intra coding where motion compensation is unnecessary, the reference macroblock data is not read out.

The data which has thus been given motion compensation by the motion compensation circuit 87 is added in the arithmetic unit 85 to the output data of the IDCT circuit 84. This addition output is the data of the B-picture and is not utilized as a reference picture for motion compensation, so the output is not stored in the frame memory 86. The picture data of the presently decoded B-picture is output from the output terminal 88.

Next, the operation of the error correction in the moving image decoding apparatus of this invention where the error correction of a picture is needed will be described.

For example, if abnormality occurs in the decoding of the variable length decoding circuit 82 because some of the coded data are being lost in the transmission line, the variable length decoding circuit 82 will set the error flag S40 to "1". At this time, the variable length decoding circuit 82 gets into its error processing mode and stores the information of the address ADR1 of the macroblock decoded last. Then, the variable length decoding circuit 82 searches for the next synchronization code from the input bit stream in order to return back its normal state. If the next synchronization code is found, then the address ADR2 of the macroblock at the time of the return to the normal state will be decoded. Then, the macroblock being lost during error processing is understood from the addresses ADR1 and ADR2, and the error correction of the pictures is started.

The specification of a reference picture for error correction is performed by a controller 100. That is, the controller 100 determines and outputs predictive mode information which is used for specification of a reference picture in correction an error, i.e., motion compensation mode information S20. This controller 100 is constituted, for example, as show in FIG. 14. With the constitution of FIG. 14, a description will be made of the determination method of the motion compensation mode information S20 in the controller 100.

Figure 14:
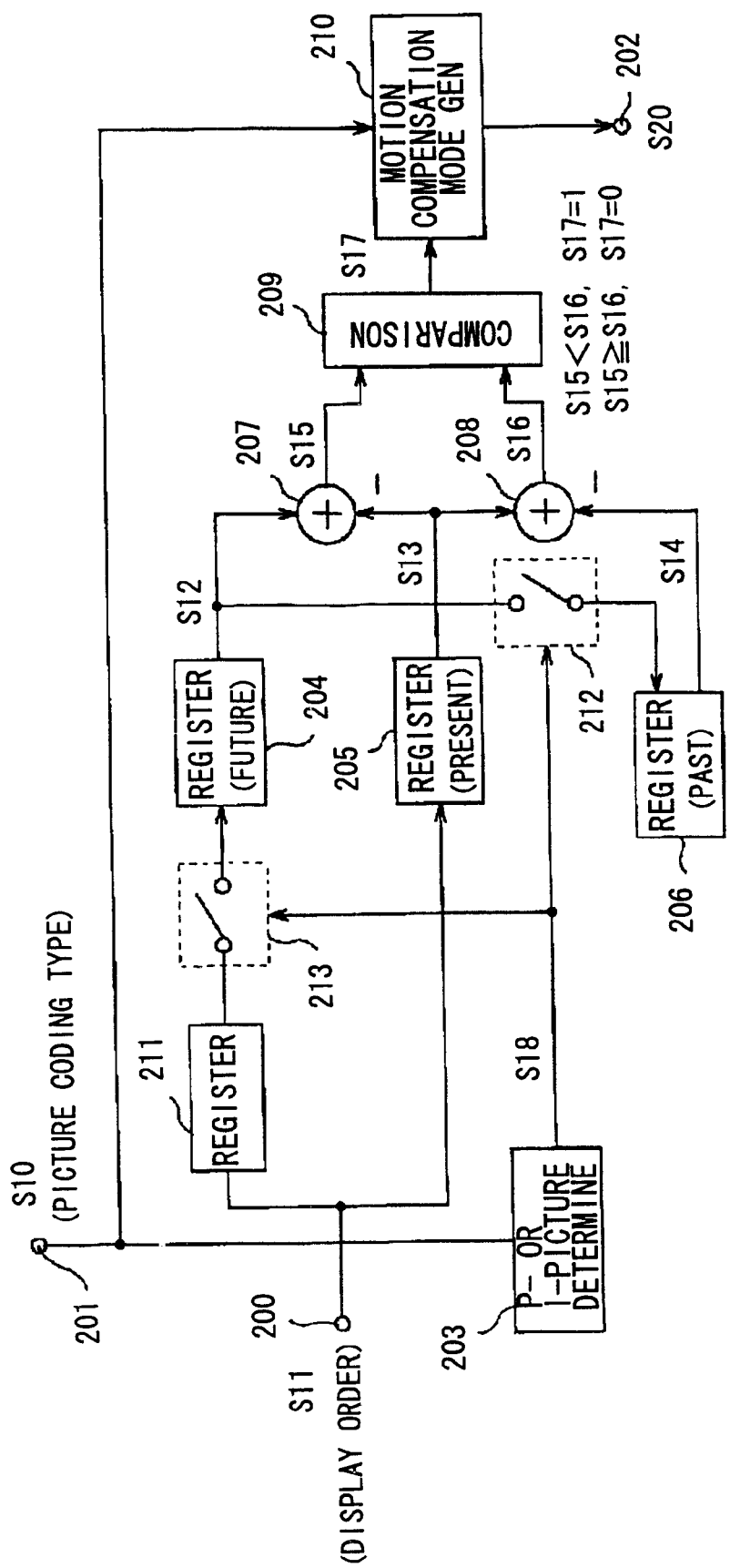
FIG. 14 is a block circuit diagram showing the constitution of an error correction controller.

In FIG. 14, picture coding type information S10 is input to a terminal 201 of the controller 100, and picture display order information S11 is input to a terminal 200 of the controller 100. The picture coding type information S10 and the picture display order information S11 belong to the respective frames of the input bit stream supplied to the terminal 80 of FIG. 13, and are decoded and supplied by the aforementioned variable length decoding circuit 82. For example, when the moving image data, coded with a prediction structure such as that shown in FIGS. 5A and 5B, is an input bit stream, the aforementioned picture coding type information S10 and picture display order information S11 on the respective pictures have become values shown in FIG. 15. Note in FIG. 15 that the subscripts of I, P, and B indicating picture coding type represent display order.

The picture display order information S11, input from the terminal 200 of the controller 100, is stored in a registers 205 and 211. The output value of the register 211 is sent through a switch 213 to a register 204. The output value S12 of the register 204 is sent to an arithmetic unit 207 as an addition signal and is also sent through a switch 212 to a register 206. The output value S14 of this register 206 is sent to an arithmetic unit 208 as an arithmetic signal. Also, the output value S13 of a register 205 is sent to the aforementioned arithmetic unit 207 as a subtraction signal and also to the arithmetic 208 as an addition signal.

On the other hand, the picture coding type information S10, input from the terminal 201 of the controller 100, is sent to a judgment circuit 203. The judgment circuit 203 judges which of the I-, P-, and B-pictures the aforementioned picture coding type information S10 indicates, and outputs a flag S18 representative of the judgment result. When the picture coding type information S10 indicates the I-picture or the P-picture, the judgment circuit 203 sets the flag S18 to "1". The flag S18 is sent to the switches 213 and 212 as a switching control signal, and the switches 213 and 212 are turned on when the flag S18 indicates "1". When the flag S18 is "1", the output value S12 of the register 204 is written to the register 206 through the switch 212 and then the value of the register 211 is written to the register 204 through the switch 213.

In the arithmetic unit 207, a difference between the output value S12 of the register 204 and the output value S13 of the register 205 is calculated and a differential value S15 corresponding to the difference is output. Also, in the arithmetic unit 208, a difference between the output value S13 of the register 205 and the output value S14 of the register 206 is calculated and a differential value S16 corresponding to the difference is output. That is, the differential value S15 from the arithmetic unit 207 is an inter picture distance Db from the present picture of an object of decoding to a future reference picture of motion compensation. The differential value S16 from the arithmetic unit 207 is an inter picture distance Df from the present picture of an object of decoding to a past reference picture of motion compensation. For example, in a case where the moving image data, coded with a prediction structure such as that shown in FIGS. 5A and 5B, is an input bit stream, if it is assumed that the output value S12 of the aforementioned register 204, the output value S13 of the aforementioned register 205, and the output value S14 of the aforementioned register 206 assume values such as those shown in FIG. 15 at respective pictures, then the value of the distance Db which is indicated by the aforementioned differential value S15 and the value of the distance Df which is indicated by the differential value S16 will become as shown in FIG. 15.

The differential values S15 and S16, obtained as described above, are input to a comparator 209. In the comparator 209, the differential values S15 and S16 are compared. When the differential value S15 is lesser, the flag S17 is set to "1". This flag S17 is input to a motion compensation mode generation circuit 210.

In the motion compensation mode generation circuit 210, with the aforementioned flag S17 and the picture coding type information S10, the motion compensation mode information S20 (i.e., predictive mode) is determined as follows. For example, when the aforementioned picture coding type information S10 indicates a P-picture or an I-picture, the motion compensation mode information S20 representative of a forward predictive mode is output. Also, when the aforementioned picture coding type information S10 indicates a B-picture and the flag S17 is "0", the motion compensation mode information S20 representative of a forward predictive mode is output. In addition, when the flag S17 is "1", the motion compensation mode information S20 representative of a backward predictive mode is output.

In this way, in the controller 100 of FIG. 13 the motion compensation mode information S20 is generated.

Returning to FIG. 13, when the error flag S40 is "1", the motion compensation mode information S20 (S25) from the aforementioned controller 100 through the switching terminal "b" side of the switch 220 is supplied to the motion compensation circuit 87. Also, during the time the error flag S40 is "1", the variable length decoding circuit 82 sets the motion vector information S31 and S32 to "0" and the quantization data S101 to "0".

The operation thereafter is performed as described in the aforementioned decoding circuit.

If the macroblocks being lost due to errors are all corrected, then the error flag S40 will be set to "0". Thereafter, the decoding of pictures is started at a normal macroblock address ADR2.

Also, while in the foregoing explanation the processing of the brightness signal has been described, the processing of color difference signals is also performed in the same way. In this case, there is used a motion vector where a motion vector of a corresponding brightness block is reduced by half in the vertical and horizontal directions.

Next, another embodiment of the moving image decoding apparatus of this invention will be described. The basis circuit constitution is the same as FIG. 13, and only the control method of the system differs. The point differing from the aforementioned embodiment is the constitution of the variable length decoding circuit 82, the nature of the error flag S40, and a method of switching the switch 220 which is switched and controlled by the error flag S40. These differences will hereinafter be described.

The decoding circuit is the same, except for the variable length decoding circuit 82. The variable length decoding circuit 82 has an internal memory so that decoded motion vector information and motion compensation mode information are stored. For example, decoding information for a single picture is stored.

The error correction method in this embodiment will hereinafter be described.

For example, if abnormality occurs in the decoding process of the variable length decoding circuit 82 because some of the coded data are being lost in the transmission line, the variable length decoding circuit 82 will get into an error processing mode and store the information of the address ADR1 of the macroblock decoded last. Then, the variable length decoding circuit 82 searches for the next synchronization code from the input bit stream in order to return back its normal state. If the next synchronization code is found, then the address ADR2 of the macroblock at the time of the return to the normal state will be decoded. Then, the macroblock being lost during the error processing is understood from the addresses ADR1 and ADR2, and the error correction of the pictures is started.

The motion compensation mode and motion vector for error correction are independently specified by the error correction controller 100 and the variable length decoding circuit 82. With the control of the error flag S40, either the motion compensation mode information S20 or S30 is selected by the switch 220. When the error flag S40 is "0", the motion compensation mode information S30 from the variable length decoding circuit 82 is output as a signal S25 via the switch 220. When the error flag S40 is "1", the motion compensation mode information S20 from the controller 100 is output as a signal S25 via the switch 220.

The constitution and operation of the error correction controller 100 is as described above, and the motion compensation mode information S20 is output from the controller 100.

Also, in the variable length decoding circuit 82, the motion compensation mode information S30 and motion vector information S31 and S32 for error correction are generated by use of the forward motion vector information FMVX, the backward motion vector information BMVX, and the motion compensation mode information MCX which have been stored in the internal memory of the variable length decoding circuit 82. For example, the forward motion vector information FMVX, the backward motion vector information BMVX, and the motion compensation mode information MCX of the macroblock (for example, left side, upper, or recently decoded value), which are adjacent to the address of the macroblock of an object of the present error correction, are used.

That is, the motion compensation mode information S30 and motion vector information S31 and S32 of the present macroblock and the error flag S40 are determined as follows.

For example, when the picture coding type information S10 indicates an I-picture, the error flag S40 is set to "1", and the motion compensation mode information S30 and the motion vector information S31 are set to "0". Then, the data of macroblocks of I-picture is replaced with the data of macroblocks of the same address as the macroblocks of I-picture which should be error corrected, in the one preceding P-picture, to correct error.

Also, when the picture coding type information S10 indicates a P-picture, the forward motion vector information FMVX, the backward motion vector information BMVX, and the motion compensation mode information MCX of the adjacent macroblock, which have been stored in the internal memory of the variable length decoding circuit 82, are set to the motion vector information S31 and S32 and the motion compensation mode information S30, and the error flag S40 is set to "0".

In addition, when the picture coding type information S10 indicates a B-picture and also the motion compensation mode information MCX stored in the internal memory indicates the forward predictive mode or the backward predictive mode, the forward motion vector information FMVX, the backward motion vector information BMVX, and the motion compensation mode information MCX of the adjacent macroblock, which have been stored in the internal memory of the variable length decoding circuit 82, are set to the motion vector information S31 and S32 and the motion compensation mode information S30, and the error flag S40 is set to "0".

Furthermore, when the picture coding type information S10 indicates a B-picture and also the motion compensation mode information MCX stored in the internal memory indicates the bidirectionally predictive mode, the error flag S40 is set to "1", and likewise the forward motion vector information FMVX and the backward motion vector information BMVX, which have been stored in the internal memory of the variable length decoding circuit 82, are set to the motion vector information S31 and S32. That is, in this case, the motion compensation mode is in the one-direction prediction of the picture where the distance from the present picture to the motion compensation reference picture is shorter, and for the motion vector at that time, a value estimated from the adjacent macroblock is used. The reason that, in this case, the error flag S40 is set to "1" and the bidirectionally predictive mode of the motion compensation mode information MCX is not used is that, when the values of the motion vectors of the forward motion vector information FMVX and the backward motion vector information BMVX differ greatly from the true vector value of the present macroblock, there are some cases where the picture quality impression of the added and averaged macroblock of the past and future reference macroblocks made by the bidirectionally predictive mode becomes worse. In the worse case, the color and the brightness of the error corrected macroblock often change.

The motion compensation mode information S30 thus determined and the motion compensation mode information S20 determined in the controller 100 independently of the information S30 are sent to the switch 220. Since this switch 220 is switched and controlled based on the error flag S40, either the information S30 or the information S20 is selected. When the error flag S40 is "0", the motion compensation mode information S30 is output from the switch 220 as a signal S25. When the error flag S40 is "1", the motion compensation mode information S20 is output from the switch 220 as a signal S25.

Note that, during the error correction processing, the variable length decoding circuit 82 sets the quantization data S101 to "0".

The operation thereafter is performed as described in the aforementioned decoding circuit. If the macroblocks being lost due to errors are all corrected, then the variable length decoding circuit 82 will return to normal operation and the decoding of pictures will be started at a normal macroblock address ADR2.

As has been described above, in the moving image decoding apparatus of the present invention, when the B-picture is decoded, the distance to the past reference picture and also the distance to the future reference picture are calculated and the error correction of pictures is adaptively changed. More specifically, the motion compensation mode is considered as the prediction of the reference picture where the inter picture distance from the present picture is shorter. Since generally the error correction can be made with the present picture and the reference picture whose correlation is stronger, the motion of an error corrected moving image can be made better than the conventional method.

Furthermore, according to the moving image decoding method and system of the present invention, the motion compensation mode and motion vector of the macroblock, which is adjacent to the macroblock which is presently decoded, are used for error correction, and by estimating values being lost from the present macroblock, greater advantages are obtainable. In the present invention, when the estimated motion compensation mode is in the bidirectionally predictive mode, it is changed to the one-direction prediction of the reference picture where the inter picture distance from the present picture is shorter. As a problem with the case of the bidirectionally predictive mode, when the value estimated from the motion vector of the adjacent macroblock differs greatly from the true vector value of the present macroblock, there are some cases where the picture quality impression of the added and averaged macroblock made by the bidirectionally predictive mode becomes worse (in the worse case, the color and the brightness of an error corrected macroblock change). However, the present invention can prevent this problem. Furthermore, the error correction of the present invention is most effective in the case of a prediction structure where two or more B-pictures exist between I- and P-pictures or between P-pictures, such as that shown in FIGS. 5A and 5B. Since this prediction structure is a structure which is most generally used in MPEG, the present invention has, in practical use, a greater effect.

As evident in the foregoing description, in the moving image coding method and system of the present invention, a distance between a video signal of a predetermined picture unit and a time preceding past reference picture and also a distance between a video signal of a predetermined picture unit and a time following future reference picture are calculated in coding a moving image by motion predictive coding. The motion compensation predictive coding which is applied to the video signal of a predetermined picture unit is selected in accordance with the calculated distances. With this arrangement, there can be realized a moving image encoding method and a moving image encoding apparatus where the coding efficiency of a moving image can be greatly enhanced.

Also, in the moving image decoding method and system of the present invention, from a coded signal obtained by coding video signal of a predetermined picture unit of a moving image signal with the aid of a predetermined predictive video signal by motion compensation predictive coding, the video signal of a predetermined picture unit is decoded by motion compensation. In reproducing the moving image signal, there is calculated a distance between the video signal of a predetermined picture unit and a time preceding past reference picture and also a distance between the video signal of a predetermined picture unit and a time following future reference picture. A motion compensation mode with respect to the error detected video signal of a predetermined picture unit is selected in accordance with the calculated distances. With this arrangement, the motion of an error corrected moving image can be made better.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A moving image decoding method for decoding a coded moving image signal, said coded moving image signal having been formed from a moving image signal, the method comprising:
a first step of receiving coding information including said coded moving image signal and a predictive coding mode indicating a type of motion compensation to be used in decoding said coded moving image signal;
a second step of generating an inverse quantized signal by inverse quantizing said coded moving image signal and generating a residual signal by performing an inverse orthogonal transform on said inverse quantized signal;
a third step of generating a predictive picture signal by applying motion compensation to a reference picture signal in accordance with said predictive coding mode;
a fourth step of adding said residual signal to said predictive picture signal to generate a reproduced image signal;
a fifth step of detecting an error within a block of said coded moving image signal, said block being positioned within an error frame of said coded moving image signal, and said error being based on a calculation performed in the decoding system; and
a sixth step of stopping decoding of said block when an error is detected at said fifth step; wherein
said predictive coding mode is selected based upon the values of a first inter picture distance indicating a nominal distance between said coded moving image signal and a past reference picture signal which temporally precedes said coded moving image signal, and a second inter picture distance indicating a nominal distance between said coded moving image signal and a future reference picture signal which temporally follows said coded moving image signal.

2. The moving image decoding method according to claim 1, further comprising:
a seventh step of calculating a first inter picture error distance between said error frame and said past reference picture signal, and a second inter picture error distance between said error frame and said future reference picture signal; and
an eighth step of replacing said block in which said error exists with a replacement block that is positioned within a replacement frame, said replacement block being selected from said past reference picture signal when said first inter picture error distance is smaller than said second inter picture error distance, and said replacement block being selected from said future reference picture signal when said second inter picture error distance is larger than said first inter picture error distance.

3. The moving image decoding method according to claim 2, wherein:
said coding information includes picture display order information indicating the display order of multiple frames of said moving image signal; and
at said seventh step, said first inter picture error distance and said second inter picture error distance are calculated using said picture display order information.

4. The moving image decoding method according to claim 2, wherein
at said eighth step, the position within said replacement frame of said replacement block corresponds to the position within said error frame of said block in which said error exists.

5. A moving image decoding method for decoding a coded moving image signal, said coded moving image signal having been formed from a moving image signal, the method comprising:
a first step of receiving coding information including said coded moving image signal and a predictive coding mode indicating a type of motion compensation to be used in decoding said coded moving image signal; wherein said predictive coding mode is selected based upon the values of a first inter picture distance indicating a nominal distance between said coded moving image signal and a past reference picture signal which temporally precedes said coded moving image signal, and a second inter picture distance indicating a nominal distance between said coded moving image signal and a future reference picture signal which temporally follows said coded moving image signal;
a second step of generating an inverse quantized signal by inverse quantizing said coded moving image signal and generating a residual signal by performing an inverse orthogonal transform on said inverse quantized signal;
a third step of generating a predictive picture signal by applying motion compensation to a reference picture signal in accordance with said predictive coding mode;
a fourth step of adding said residual signal to said predictive picture signal to generate a reproduced image signal; and
a fifth step of detecting an error within a block of said coded moving image signal, said error being based on a calculation performed in the decoding system;
wherein said block in which said error is detected is decoded according to coding information for a block adjacent to said block in which said error is detected.

6. The moving image decoding method according to claim 5, wherein when said block in which said error is detected is decoded, said coding information for said adjacent block is used at said third step.

7. A moving image decoding method for decoding a coded moving image signal, said coded moving image signal having been formed from a moving image signal, the method comprising the steps of:

receiving coding information including said coded moving image signal and a predictive coding mode indicating a type of motion compensation to be used in decoding said coded moving image signal; wherein said predictive coding mode is selected based upon the values of a first inter picture distance indicating a nominal distance between said coded moving image signal and a past reference picture signal which temporally precedes said coded moving image signal, and a second inter picture distance indicating a nominal distance between said coded moving image signal and a future reference picture signal which temporally follows said coded moving image signal;

generating an inverse quantized signal by inverse quantizing said coded moving image signal and generating a residual signal by performing an inverse orthogonal transform on said inverse quantized signal;

generating a predictive picture signal by applying motion compensation to a reference picture signal in accordance with said predictive coding mode;

adding said residual signal to said predictive picture signal to generate a reproduced image signal;

detecting an error within a block of said coded moving image signal, said block being positioned within an error frame of said coded moving image signal;

calculating a first inter picture error distance between said error frame and said past reference picture signal, and a second inter picture error distance between said error frame and said future reference picture signal; and determining the predictive coding mode used to decode a block adjacent to said block in which said error is detected, wherein when said determined predictive coding mode is not a bidirectional predictive mode, said determined mode is used to decode said block in which said error exists, and when said determined predictive coding mode is a bidirectional predictive mode, a one-way predictive mode is used to decode said block in which said error exists, the type of said one-way predictive coding mode being determined on the basis of said first and second inter picture error distances.

* * * * *